United States Patent
Murase et al.

(10) Patent No.: US 12,486,909 B2
(45) Date of Patent: Dec. 2, 2025

(54) FLUID CONTROL VALVE AND METHOD FOR MANUFACTURING THE SAME

(71) Applicant: CKD CORPORATION, Komaki (JP)

(72) Inventors: Hiroyuki Murase, Komaki (JP); Atsushi Tsuneduka, Komaki (JP); Mayuko Okada, Komaki (JP)

(73) Assignee: CKD CORPORATION, Komaki (JP)

( * ) Notice: Subject to any disclaimer, the term of this patent is extended or adjusted under 35 U.S.C. 154(b) by 129 days.

(21) Appl. No.: 18/142,450

(22) Filed: May 2, 2023

(65) Prior Publication Data

US 2023/0383853 A1    Nov. 30, 2023

(30) Foreign Application Priority Data

May 24, 2022    (JP) ................. 2022-084617

(51) Int. Cl.

| | | |
|---|---|---|
| F16K 7/17 | (2006.01) | |
| F16K 7/16 | (2006.01) | |
| F16K 31/122 | (2006.01) | |
| B23K 26/21 | (2014.01) | |
| B29C 48/255 | (2019.01) | |
| F16K 41/12 | (2006.01) | |

(52) U.S. Cl.
CPC ............. *F16K 7/17* (2013.01); *F16K 7/16* (2013.01); *F16K 31/1221* (2013.01); *B23K 26/21* (2015.10); *B29C 48/255* (2019.02); *F16K 41/12* (2013.01)

(58) Field of Classification Search
CPC .......... F16K 7/17; F16K 31/1221; F16K 7/16; F16K 41/12; B29C 48/255
See application file for complete search history.

(56) References Cited

U.S. PATENT DOCUMENTS

| | | | | |
|---|---|---|---|---|
| 5,779,224 A | * | 7/1998 | Fukano | ............... F16K 41/12 |
| | | | | 251/64 |
| 6,382,588 B1 | * | 5/2002 | Hierold | ............... F02M 61/166 |
| | | | | 251/129.01 |

(Continued)

FOREIGN PATENT DOCUMENTS

| | | |
|---|---|---|
| JP | 2004-90628 A | 3/2004 |
| JP | 2009-143149 A | 7/2009 |

(Continued)

OTHER PUBLICATIONS

JP2020026846 Matsuzawa Hironobu, English translation of Japanes patent published Feb. 20, 2020.*

(Continued)

*Primary Examiner* — Craig M Schneider
*Assistant Examiner* — Christopher D Ballman
(74) *Attorney, Agent, or Firm* — Oliff PLC

(57) ABSTRACT

A fluid control valve includes a diaphragm assembly including a shaft member joined to an end of a drive shaft on the side near an annular valve seat, a membrane member made of Perfluoro alkoxy Alkane and located in surface contact with the end face of the shaft member on the opposite side to the end joined to the drive shaft, and a weld part formed by laser welding at the interface between the shaft member and the membrane member to join the shaft member and the membrane member. The shaft member is made of fluorine resin with carbon-based additive dispersed.

8 Claims, 14 Drawing Sheets

(56) References Cited

U.S. PATENT DOCUMENTS

| | | | |
|---|---|---|---|
| 7,164,094 B2* | 1/2007 | Offer | B23K 11/11 |
| | | | 219/76.1 |
| 7,744,060 B2* | 6/2010 | Sneh | F16K 31/1221 |
| | | | 251/331 |
| 9,995,415 B2* | 6/2018 | Imai | F16L 37/32 |
| 10,006,564 B2* | 6/2018 | Okamura | F16K 1/42 |
| 10,228,075 B2* | 3/2019 | Imai | F16K 31/1266 |
| 10,695,876 B2* | 6/2020 | Rajagopalan | B23K 9/0953 |
| 10,969,025 B2* | 4/2021 | Matsuzawa | F16K 7/12 |
| 11,808,381 B2* | 11/2023 | Glime, III | F16K 7/17 |
| 12,076,934 B2* | 9/2024 | Murase | B29C 66/81267 |
| 2004/0004199 A1* | 1/2004 | Igarashi | F16K 31/1221 |
| | | | 251/63.5 |
| 2005/0285064 A1* | 12/2005 | Yoshino | F16K 31/1221 |
| | | | 251/61.5 |
| 2006/0060813 A1* | 3/2006 | Iwabuchi | F16K 7/16 |
| | | | 251/331 |
| 2008/0116412 A1* | 5/2008 | Masamura | F16K 7/14 |
| | | | 251/227 |
| 2015/0129791 A1* | 5/2015 | Okita | F16K 7/14 |
| | | | 251/331 |
| 2016/0053899 A1* | 2/2016 | Glime | F16K 7/16 |
| | | | 251/331 |
| 2017/0108149 A1 | 4/2017 | Imai et al. | |
| 2022/0186845 A1* | 6/2022 | Inada | G01F 1/42 |

FOREIGN PATENT DOCUMENTS

| | | |
|---|---|---|
| JP | 2010-121689 A | 6/2010 |
| JP | 2019-184015 A | 10/2019 |
| JP | 2020-26846 A | 2/2020 |
| JP | 2022-029522 A | 2/2022 |
| KR | 10-2017-0045122 A | 4/2017 |

OTHER PUBLICATIONS

Oct. 8, 2024 Office Action issued in Japanese Patent Application No. 2022-084617.

Jul. 27, 2024 Office Action issued in Korean Patent Application No. 10-2023-0058387.

* cited by examiner

FLUID CONTROL VALVE AND METHOD FOR MANUFACTURING THE SAME

CROSS-REFERENCE TO RELATED APPLICATIONS

This application is based upon and claims the benefit of priority to Japanese Patent Application No. 2022-084617 filed on May 24, 2022, the entire contents of which are incorporated herein by reference.

BACKGROUND

Technical Field

The present disclosure relates to a fluid control valve including a flow passage for flowing a control fluid, an annular valve seat placed in the flow passage, a diaphragm assembly moved to contact with or separate from the annular valve seat to control a flow of the control fluid, and a drive shaft, which is located coaxially with the annular valve seat and moves the diaphragm assembly in a direction to contact with or separate from the annular valve seat, and a method for manufacturing the fluid control valve.

Related Art

As a fluid control valve for controlling a flow of fluid by moving a valve element to contact with or separate from a valve seat, a fluid control valve for controlling a flow rate of chemical solutions is used in, for example, a semiconductor manufacturing system. In this fluid control valve, a diaphragm assembly is operated by a drive shaft to contact with or separate from an annular valve seat for controlling a flow of a control fluid. One example of the diaphragm assembly is disclosed in, for example, Japanese unexamined patent application publication No. 2022-029522 (JP '522), in which a membrane member (which is a diaphragm in JP '522) is joined by laser welding to a shaft member coupled to a drive shaft (which is an auxiliary shaft in JP '522). This membrane member serves to partition the inside of the fluid control valve into a section for a liquid contact part that contacts the control fluid, i.e., a liquid contact section, and a section for a liquid non-contact part that does not contact the control fluid, i.e., a liquid non-contact section. The membrane member undergoes repeated elastic deformation during contacting and separating movements of the diaphragm assembly with the annular valve seat.

SUMMARY

Technical Problems

First issue is discussed below.

When a control fluid passes through a flow passage, either positive or negative charges are adsorbed on the inner surface of the flow passage at the interface between the fluid and the passage inner surface, and thus the fluid has the remaining charges of opposite polarity to the charges adsorbed on the passage inner surface. When the control fluid flowing in contact with the passage is drawn away from the passage inner surface, an electric field is generated, electrically charging the control fluid and the liquid non-contact part. That is, static electricity is generated.

When the control fluid and the liquid non-contact part are electrically charged, a large potential difference occurs between the liquid non-contact part and the liquid non-contact part in the fluid control valve. Since the thickness of the membrane member is very thin, e.g., about 0.2 mm, such an increased potential difference may cause dielectric breakdown. When the dielectric breakdown occurs, the charges rapidly transfer inside the membrane member, thereby generating heat. This generated heat may cause microcracks in the membrane member at sites with the dielectric breakdown, which may result in leakage of the fluid. Since the membrane member repeats elastic deformation to contact with or separate from the valve seat, stress tends to concentrate in the cracked sites, causing the cracks to expand and lead to fatigue failure. Furthermore, for example, in a semiconductor manufacturing apparatus, if the electrically-charged control fluid contacts with a wafer during development of circuit patterns, there is a risk of defects that, e.g., defective circuit patterns may be developed.

As a fluid control valve designed to prevent dielectric breakdown of a membrane member, there is known a diaphragm valve disclosed in Japanese unexamined patent application publication No. 2010-121689 (JP '689). This diaphragm valve is configured such that a conductive film is formed on a liquid non-contact part of a valve unit in order to urge discharging of static electricity. However, the position of the conductive film is greatly apart from the liquid contact part, the conductive film may not be effective in preventing the liquid contact part from becoming electrically charged.

Second issue will be discussed below.

When a shaft member and a membrane member are joined by laser welding, the membrane member affected by heat during welding may decrease in strength. FIG. 14 is a cross-sectional view showing a part of a diaphragm assembly consisting of a membrane member 2222 and a shaft member 2221, which are joined by laser welding at or around the interface of the membrane member 2222 and the shaft member 2221. As shown in FIG. 14, a weld part W21 is formed by laser welding at the boundary between the membrane member 2222 and the shaft member 2221. This weld part W21 is a zone including a portion of the membrane member 2222 and a portion of the shaft member 2221, which have been melted by laser irradiation and then solidified, that is, a zone affected by heat of laser welding (a heat affected zone). This heat affected zone in the membrane member 2222 has a heat affected range A21, corresponding to the distance in the thickness direction of the membrane member 2222, widely extending to about 80% of the thickness t21 of the membrane member 2222. Such a large heat affected range may deteriorate the strength of the membrane member 2222. The membrane member 2222 with the deteriorated strength may cause fatigue failure when repeating elastic deformation for contacting and separating movements of the diaphragm assembly.

The present disclosure has been made to address the above problems and has a purpose to provide a fluid control valve capable of preventing electrical charging of a control fluid and further preventing deterioration of strength of a membrane member caused by laser welding, and a method for manufacturing the fluid control valve.

Means of Solving the Problems (1) To achieve the above-mentioned purpose, one aspect of the present disclosure provides a fluid control valve comprising: a flow passage for flowing a control fluid; an annular valve seat provided in the flow passage; a diaphragm assembly configured to contact with or separate from the annular valve seat to control a flow of the control fluid; and a drive shaft that is located coaxially with the annular valve seat and moves the diaphragm assembly in a direction to contact with or separate from the annular valve seat, wherein the diaphragm assembly comprises: a shaft member coupled on one side to an end of the drive shaft on a side near the annular valve seat; a membrane member made of perfluoro alkoxy alkane and positioned in surface contact with an end face of the shaft member on an opposite side from the one side coupled to the drive shaft; and a weld part that is formed by laser welding at an interface between the shaft member and the membrane member and joins the shaft member and the membrane member, and the shaft member is made of fluorine resin containing a carbon-based additive dispersed.

(2) To achieve the above-described purpose, another aspect of the present disclosure provides a method for manufacturing a fluid control valve, the fluid control valve comprising: a flow passage for flowing a control fluid; an annular valve seat provided in the flow passage; a diaphragm assembly configured to contact with or separate from the annular valve seat to control a flow of the control fluid; and a drive shaft that is located coaxial with the annular valve seat and moves the diaphragm assembly in a direction to contact with or separate from the annular valve seat, wherein the method comprises: joining, by laser welding, a shaft member, which is to be coupled on one side to an end of the drive shaft on a side near the annular valve seat, to the membrane member made of perfluoro alkoxy alkane and positioned in surface contact with an end face of the shaft member on an opposite side from the one side to be coupled to the drive shaft to form a weld part at an interface between the shaft member and the membrane member to produce the diaphragm assembly, and wherein the shaft member is made of fluorine resin containing a carbon-based additive dispersed.

According to the fluid control valve described in (1) or the fluid control valve manufacturing method described in (2), the shaft member is made of fluorine resin containing a carbon-based additive dispersed therein, so that the shaft member has higher conductivity than a shaft member made of common fluorine resin. This configuration can discharge the static electricity generated by the control fluid in passing through the flow passage, and prevent the control fluid and a liquid contact part from becoming electrically charged.

Since the control fluid and the liquid contact part can be prevented from becoming electrically charged, it is possible to prevent an increase in potential difference between the liquid contact part and a liquid non-contact part in the fluid control valve. Preventing the increase in potential difference can thus prevent the occurrence of dielectric breakdown in the membrane member. This prevention of dielectric breakdown of the membrane member can prevent the occurrence of microcracks due to dielectric breakdown and hence prevent fluid leakage and fatigue failure which may be caused by such cracks. Moreover, since the fluid control valve is configured to prevent electrical charging of a control fluid as above, it is possible to prevent for example a wafer in a semiconductor manufacturing apparatus from contacting an electrically-charged control fluid. This can reduce any risk of defects that defective circuit patterns are developed.

According to the fluid control valve described in (1) or the fluid control valve manufacturing method described in (2), the shaft member is made of fluorine resin containing a carbon-based additive dispersed therein, so that the shaft member has higher laser-light absorbability than a shaft member made of common fluorine resin. Thus, this shaft member having such a high laser-light absorbability can easily absorb a laser beam during laser welding to join the shaft member and the membrane member, so that the shaft member and the membrane member can be joined together with a lower heat quantity, or level, than ever before. This can reduce a heat affected range of the membrane member than ever before. Such a reduced heat affected range of the membrane member can prevent a decrease in strength of the membrane member due to laser welding. This can reduce any risk of fatigue failure of the membrane member caused by repeated elastic deformation.

Advantageous Effects

The fluid control valve and the method for manufacturing the fluid control valve according to the present disclosure can prevent electrical charging of a control fluid and also prevent a decrease in strength of a membrane member due to laser welding.

DETAILED DESCRIPTION OF THE EXEMPLARY EMBODIMENTS

Structure of Fluid Control Valve

Figure 1:
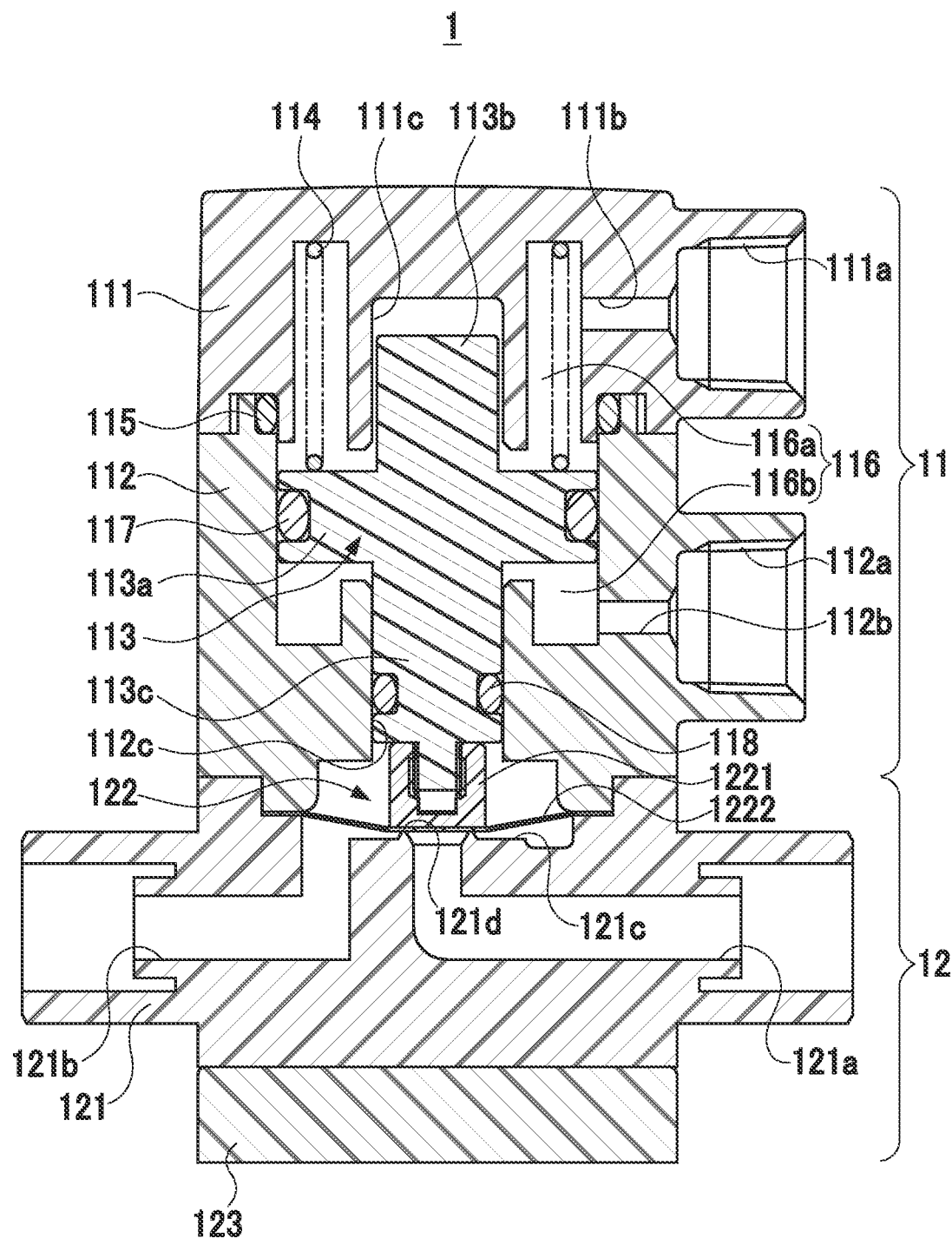
FIG. 1 is a cross-sectional view of a fluid control valve in an embodiment, showing a valve closed state.
Figure 2:
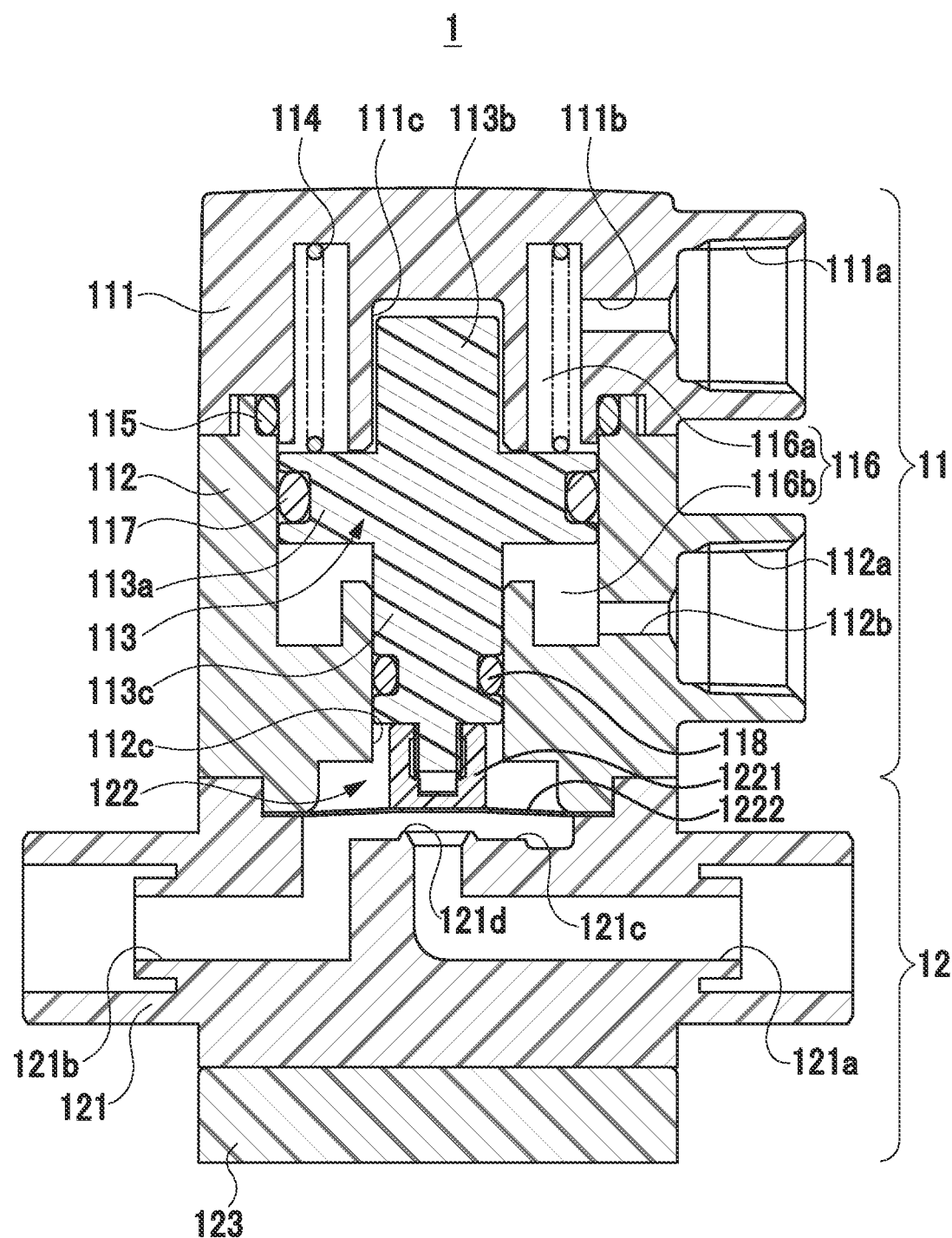
FIG. 2 is a cross-sectional view of the fluid control valve in the embodiment, showing a valve open state.
Figure 3:
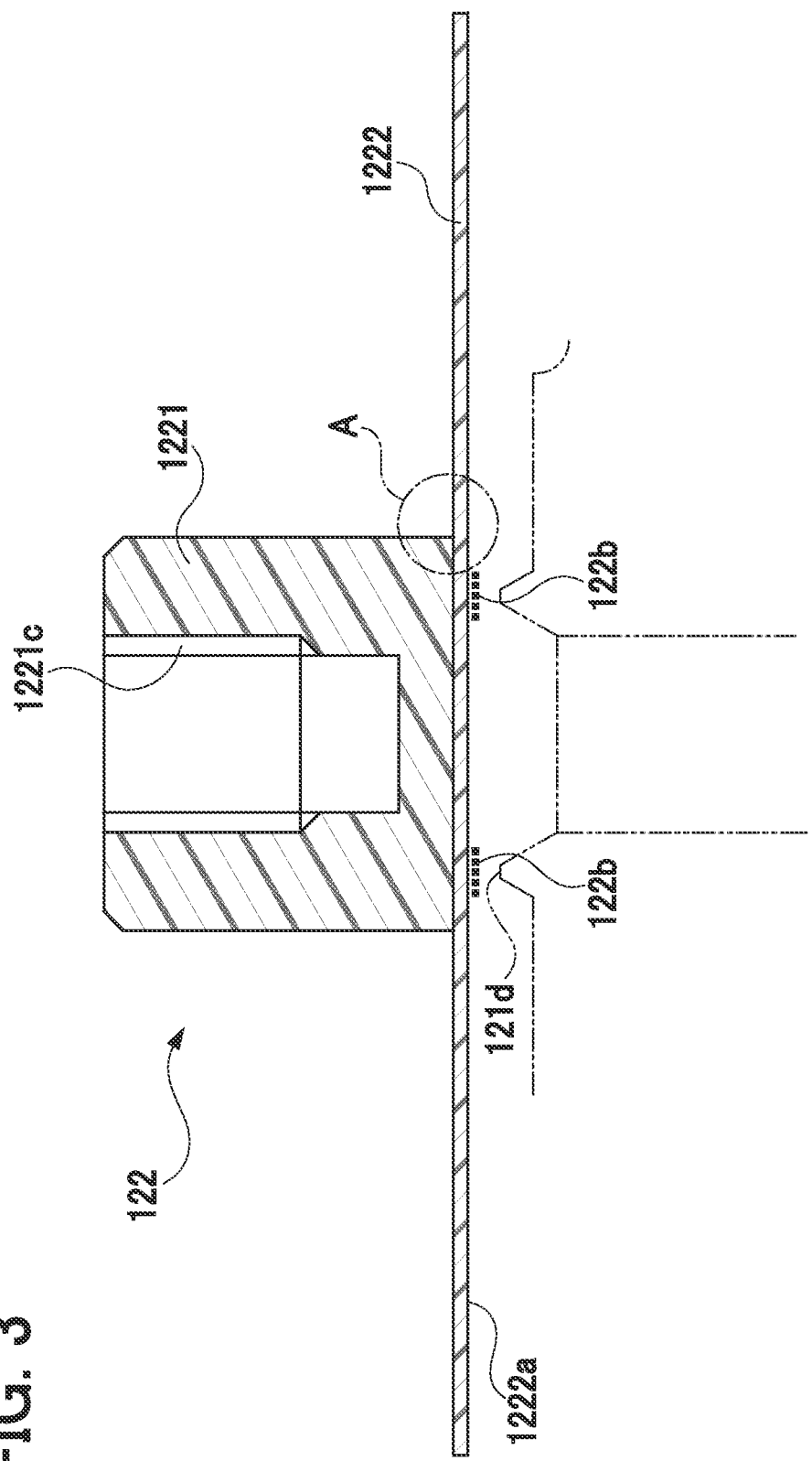
FIG. 3 is a cross-sectional view of a diaphragm assembly.
Figure 4:
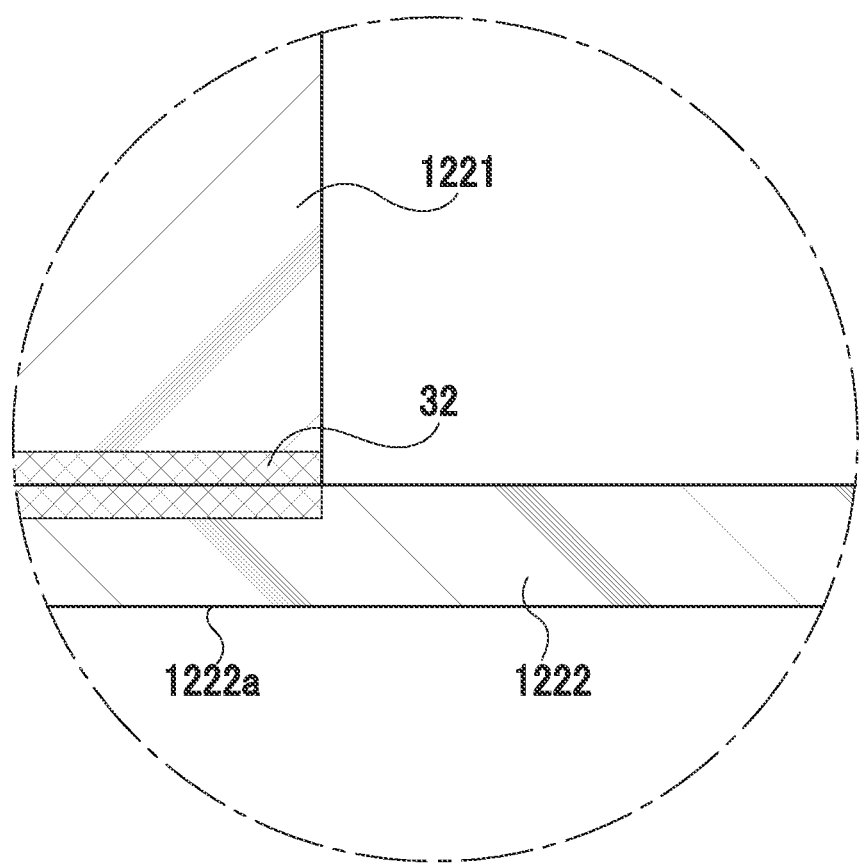
FIG. 4 is an enlarged view of a part A in FIG. 3.

A detailed description of a fluid control valve 1 in an embodiment of this disclosure will now be given referring to the accompanying drawings. FIG. 1 is a cross-sectional view of the fluid control valve 1 in the present embodiment, showing a valve closed state. FIG. 2 is a cross-sectional view of the fluid control valve 1 in the embodiment, showing a valve open state. FIG. 3 is a cross-sectional view of a diaphragm assembly 122. FIG. 4 is a partial enlarged view of a part A of the diaphragm assembly 122 in FIG. 3.

The fluid control valve 1 is an air-operated, normally closed type chemical valve for controlling a flow rate of chemical solutions in a semiconductor manufacturing process. The fluid control valve 1 includes a drive unit 11 and a valve unit 12, as shown in FIG. 1.

The drive unit 11 includes a first housing 111, a second housing 112 stacked under the first housing 111, and a drive shaft 113 placed in those housings 111 and 112. The first housing 111 has a cylindrical shape having an open end (a lower end in FIG. 1) on a side near the second housing 112 and a closed end (an upper end in FIG. 1) on the other side. The first housing 111 is formed, on its outer periphery, with a first air-inlet/outlet 111*a*. The open end of the first housing 111 on the side near the second housing 112 is hermetically fitted onto an upper end of the second housing 112 in FIG. 1 with an O-ring 115 interposed therebetween.

The second housing 112 has a cylindrical shape having an open end (the upper end in FIG. 1) on a side near the first housing 111 and an open end (a lower end in FIG. 1) on the other side near the valve unit 12. The second housing 112 is formed, on its outer periphery, with a second air-inlet/outlet 112*a*. The first housing 111 and the second housing 112 are coaxially aligned, and the inner cavity of the first housing 111 and the inner cavity of the second housing 112 form a piston chamber 116.

In the piston chamber 116, the drive shaft 113 is loaded to be slidable in a vertical direction in FIG. 1. Herein, in FIG. 1, the upper direction corresponds to a valve opening direction and the lower direction corresponds to a valve closing direction. The drive shaft 113 is provided with a circular disk-shaped piston part 113*a*, which partitions the piston chamber 116 into an upper chamber 116*a* and a lower chamber 116*b*. Further, an O-ring 117 is placed between the outer periphery of the piston part 113*a* and the inner wall of the piston chamber 116 to hermetically seal between the upper chamber 116*a* and the lower chamber 116*b*.

The upper chamber 116*a* is connected to the first air-inlet/outlet 111*a* through an air passage 111*b* and the lower chamber 116*b* is connected to the second air-inlet/outlet 112*a* through an air passage 112*b*. In the upper chamber 116*a*, a coil spring 114 is placed. In FIG. 1, a lower end of this coil spring 114 abuts on an upper end face of the piston part 113*a*, and an upper end of the coil spring 114 abuts on an upper wall surface of the upper chamber 116*a*. Thus, the drive shaft 113 is urged by the elastic force of the coil spring 114 in a valve-closing direction, i.e., downward in FIG. 1.

The drive shaft 113 includes a first columnar piston rod 113*b* on an upper end side and a second columnar piston rod 113*c* on a lower end side.

The first piston rod 113*b* is inserted in a recess 111*c* provided in a lower surface of the first housing 111 in FIG. 1 to guide the drive shaft 113 to slide in a vertical direction in FIG. 1.

The second piston rod 113*c* is inserted in a through hole 112*c* extending through a lower end face of the second housing 112 and the lower chamber 116*b*. An 118 is placed between the outer peripheral surface of the second piston rod 113*c* and the inner peripheral surface of the through hole 112*c* to hermetically seal the lower chamber 116*b*. A tip end of the second piston rod 113*c* is threaded into the diaphragm assembly 122, which constitutes the valve unit 12.

The valve unit 12 is coupled to the lower end of the drive unit 11 in FIG. 1 and includes a valve-unit body 121, the diaphragm assembly 122, and a base 123. The valve-unit body 121 includes an inflow passage 121*a* through which a fluid, such as a chemical solution, flows in the fluid control valve 1, and an outflow passage 121*b* through which the fluid flows out of the fluid control valve 1. The valve-unit body 121 includes a valve chamber 121*c* perforated in the center of the upper end face in FIG. 1. The valve chamber 121*c* provides communication between the inflow passage 121*a* and the outflow passage 121*b*. Those connected inflow passage 121*a* and outflow passage 121*b* provide a continuous flow passage for flowing a control fluid. The valve-unit body 121 is formed, on the bottom of the valve chamber 121*c*, with an annular valve seat 121*d* which the diaphragm assembly 122 contacts with or separates from.

The diaphragm assembly 122 is a combination of a shaft member 1221 and a membrane member 1222 which contacts with and separates from the annular valve seat 121*d* as shown in FIG. 3.

The shaft member 1221 is made of perfluoro alkoxy alkane (PFA) with carbon black dispersed therein. The content of carbon black is preferably set in a range from 1.5% to 5% by weight and more preferably from 3% to 4% by weight. The content in this embodiment is about 3.5% by weight.

The shaft member 1221 has a nearly columnar shape. This shaft member 1221 is formed with a screw part 1221*c* in an end face on one side near the drive shaft 113, that is, the upper end face in FIG. 1. This screw part 1221*c* is screwed with the tip end of the drive shaft 113 on the side near the annular valve seat 121*d*. Accordingly, the shaft member 1221 is coaxially fixed to the drive shaft 113, so that the shaft member 1221 is moved up and down in association with upward and downward motions of the drive shaft 113. The membrane member 1222 is joined, in surface contact, to an end face of the shaft member 1221 on an opposite side from the drive shaft 113, that is, the lower end face in FIG. 1.

The membrane member 1222 is a circular dick-shaped film made of PFA by injection molding or extrusion molding. The thickness of this membrane member 1222 is not particularly limited, but for example about 0.2 mm in the present embodiment. The membrane member 1222 is coaxially joined to the shaft member 1221. The outer peripheral edge of the membrane member 1222 is held between the second housing 112 and the valve-unit body 121 from above and below, as shown in FIG. 1. This membrane member 1222 is retained inside the valve chamber 121*c* and partitions the valve chamber 121*c* into a liquid contact section and a liquid non-contact section. The region above the membrane member 1222, on the side near the shaft member 1221, is the liquid non-contact section and the region below the membrane member 1222, on the side near the annular valve seat 121*d*, is the liquid contact section. Thus, the surface of the membrane member 1222, on the side facing the annular valve seat 121*d* (i.e., on the opposite side from the shaft member 1221), is referred to as a liquid contact surface 1222*a* which contacts the control fluid flowing through the valve chamber 121*c*.

The membrane member 1222, which is retained within the valve chamber 121*c*, repeats elastic deformation in association with vertical motions of the drive shaft 113 and the shaft member 1221. This repeated elastic deformation causes the liquid contact surface 1222*a* of the membrane member 1222 to repeatedly contact with or separate from the annular valve seat 121*d*. A portion of the liquid contact surface 1222*a*, which will contact with or separate from the annular valve seat 121*d*, is referred to as a contact portion 122*b* indicated by a thick dot line in FIG. 3. This contact portion 122*b* is preferably formed as a molded surface. This is to reduce surface roughness of the contact portion 122*b* and prevent generation of dusts due to repeated contact and separation with the annular valve seat 121*d*.

The shaft member 1221 and the membrane member 1222 are joined together by laser welding, forming a weld part 32 at the interface between the shaft member 1221 and the membrane member 1222 as shown in FIG. 4. In the diaphragm assembly 122 in the present embodiment, the weld part 32 is formed all over the interface between the shaft member 1221 and the membrane member 1222, so that the shaft member 1221 and the membrane member 1222 are bonded to each other at their whole contact portions.

Since the shaft member 1221 of the diaphragm assembly 122 is made of PFA containing dispersed carbon black, as described above, this shaft member 1221 has higher conductivity than one made of common fluorine resin. Thus, this shaft member 1221 can discharge the static electricity generated by the control fluid in passing through the flow passage, and prevent the control fluid and the liquid contact part (which is a part that contacts a fluid in the liquid contact section, for example, the liquid contact surface 1222*a* of the membrane member 1222) from becoming electrically charged. Since the control fluid and the liquid contact part can be prevented from becoming electrically charged, it is possible to prevent the potential difference between the liquid contact part and the liquid non-contact part in the fluid control valve 1 from increasing. Preventing increasing of the potential difference can thus prevent the occurrence of dielectric breakdown in the membrane member 1222. This prevention of dielectric breakdown of the diaphragm assembly 122 can further prevent the generation of microcracks due to dielectric breakdown and hence prevent the generation of fluid leakage and fatigue failure which may be caused by such cracks. Further, since the fluid control valve 1 is configured to prevent electrical charging of the control fluid as above, it is possible to prevent for example a wafer in a semiconductor manufacturing apparatus from contacting an electrically-charged control fluid. This can reduce any risk of defects that defective circuit patterns are developed.

Figure 12:
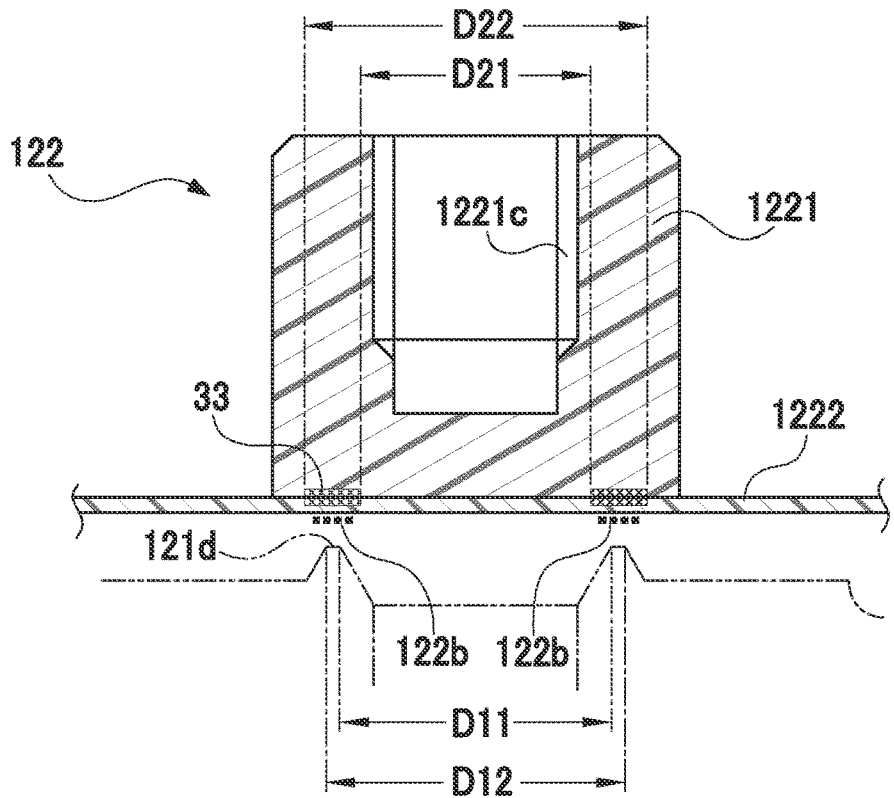
FIG. 12 is an explanatory view showing another example of a weld part of the diaphragm assembly.

The weld part joining the shaft member 1221 and the membrane member 1222 may be provided in an annular area at least on the back side of, or behind, the contact portion 122*b*, as a weld part 33 shown in FIG. 12. Specifically, the weld part 33 may be formed with at least the outer diameter D22 larger than the outer diameter D12 of the annular valve seat 121*d* and the inner diameter D21 smaller than the inner diameter D11 of the annular valve seat 121*d*. In other words, the present embodiment in which the weld part 32 is formed all over the interface between the shaft member 1221 and the membrane member 1222 is a mere one example, and shows that the outer diameter D12 is maximal and the inner diameter D11 is minimal, i.e., zero.

In a fluid control valve 1, generally, the area of a flow passage defined between the annular valve seat 121*d* and the contact portion 122*b* of the the membrane member 1222 which will contact with the annular valve seat 121*d* is smaller than the area of other flow passage or passages. This causes a control fluid to flow at a faster velocity through the passage between the annular valve seat 121*d* and the contact portion 122*b* than the other passage. Accordingly, the static electricity is likely to occur when the control fluid flows between the annular valve seat 121*d* and the contact portion 122*b*. When the weld part 33 is formed on at least the back side of the contact portion 122*b*, as shown in FIG. 12, the membrane member 1222 is joined to the high-conductive shaft member 1221 on the back side of the contact portion 122*b* on which the static electricity is apt to occur. This configuration is effective in discharging the static electricity.

Further, the configurations in which (i) the weld part 32 is formed all over the interface between the shaft member 1221 and (ii) the membrane member 1222 and the weld part 33 is formed annularly on the back side of the contact portion 122*b* achieve the following advantageous effects.

Figure 15A:
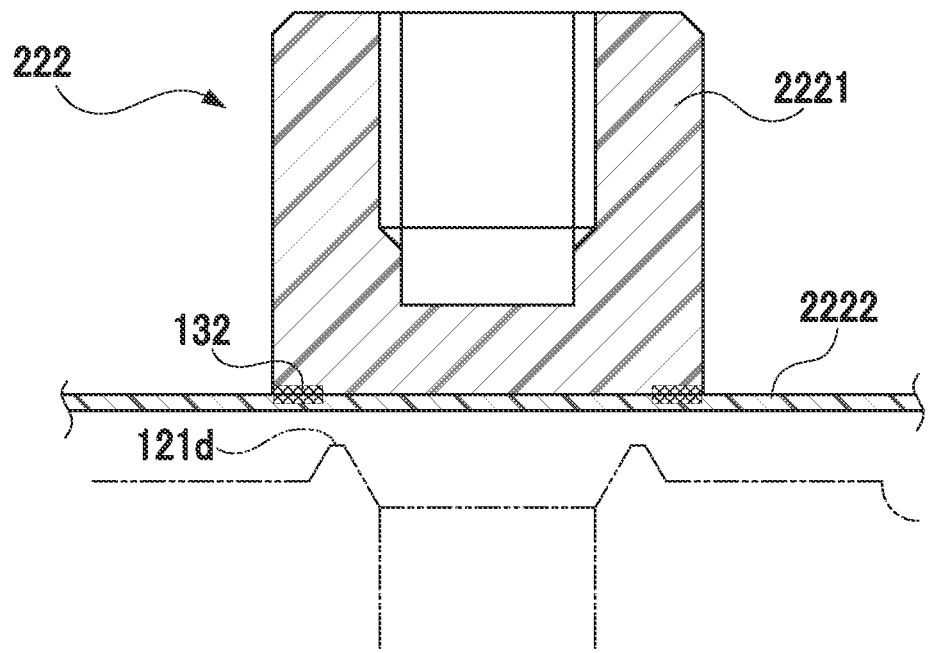
FIGS. 15A and 15B are explanatory views showing issues of a conventional fluid control valve.
Figure 15B:
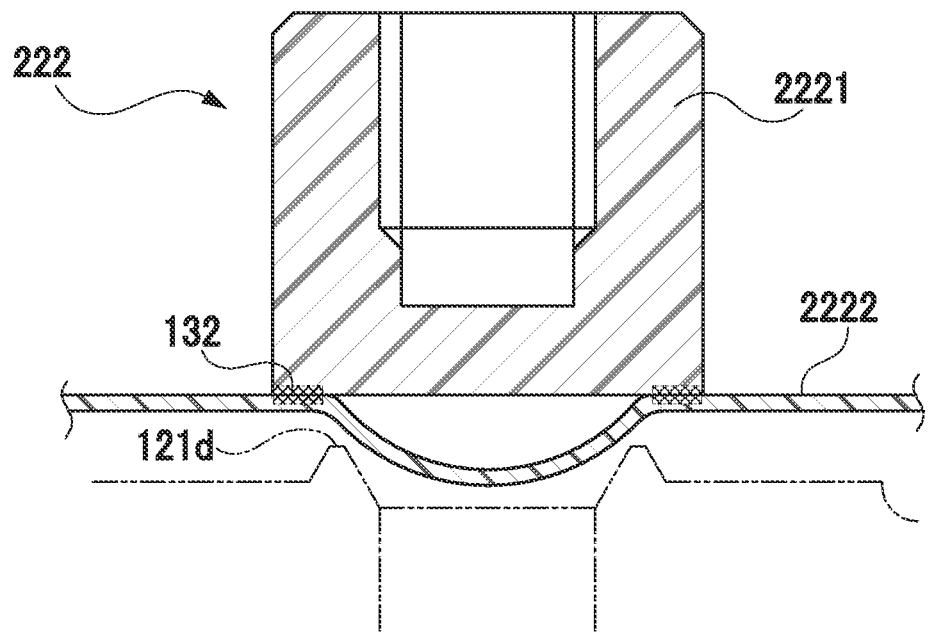

In the conventional diaphragm assembly (one example thereof is disclosed is JP unexamined patent application publication No. 2022-029522), for example, a weld part 132 joining a shaft member 2221 and a membrane member 2222 is located radially outside a contact portion which contacts the annular valve seat 121*d*, as shown in FIG. 15A. The membrane member 2222 is generally as thin as 0.5 mm or less and made of PFA with high gas permeability, and thus there is a risk that, e.g., nitrogen gas or oxygen gas may accumulate at the interface between the shaft member 2221 and the membrane member 2222. Such a gas accumulation may cause the membrane member 2222 to swell out toward the annular valve seat 121*d* as shown in FIG. 15B. Since the membrane member 2222 is welded to the shaft member 2221 at a position radially outside the contact portion, the contact portion is included in a swollen portion of the membrane member 2222. Thus, the membrane member 2222 may contact the the annular valve seat 121*d* at a position displaced from an intended position. If the position of the contact portion of the membrane member 2222 which should contact the annular valve seat 121*d* is displaced as above, a sealing failure may occur during valve closing and particles generated by wearing may enter in the control fluid.

In the diaphragm assembly 122 of the present embodiment, the weld part 32 is formed over the entire interface between the shaft member 1221 and the membrane member 1222, preventing gas that permeates through the membrane member 1222 from accumulating at the interface between the shaft member 1221 and the membrane member 1222. In the above embodiment, since the weld part 33 is annularly provided at least on the back side of the contact portion 122*b*, as shown in FIG. 12, even if the gas having permeated through the membrane member 1222 accumulates at the interface between the shaft member 1221 and the membrane member 1222, causing the membrane member 1222 to swell out toward the annular valve seat 121*d*, such a swollen portion does not include the contact portion. Thus, the contact portion 122*b* is not displaced from a proper position. Since the positional displacement of the contact portion 122*b* is prevented as above, it is possible to prevent sealing failure during valve closing and prevent particles generated by wearing from entering in the control fluid.

Figure 13:
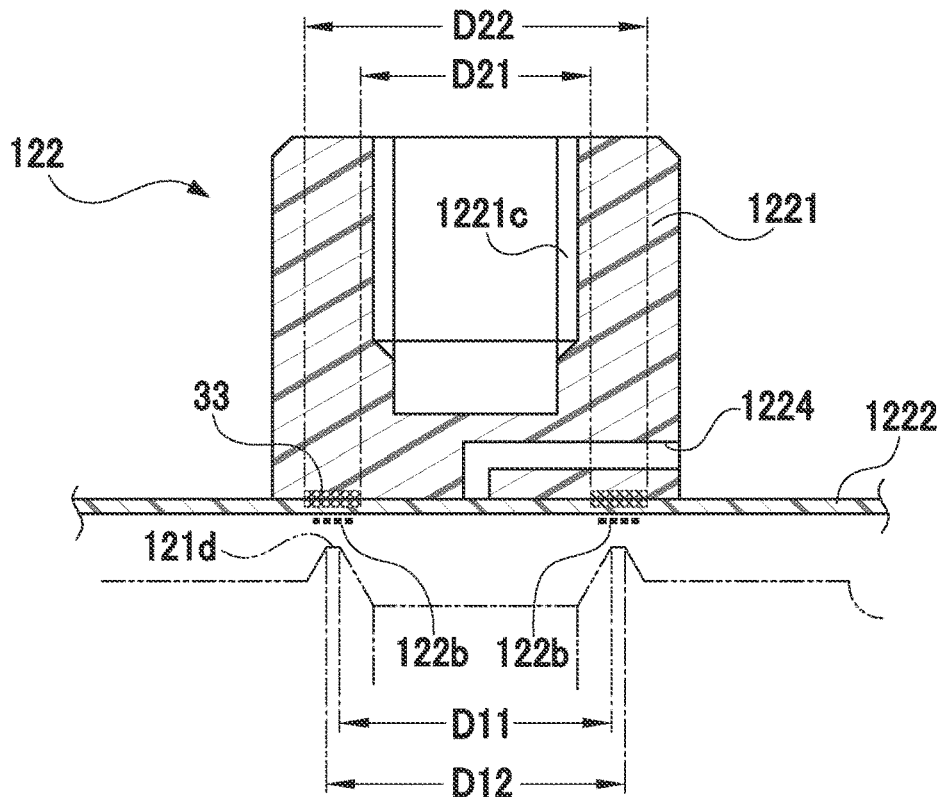
FIG. 13 is an explanatory view showing another example of a weld part of the diaphragm assembly.

In the configuration shown in FIG. 12, in which the weld part 33 is annularly provided on the back side of the contact portion 122*b*, the shaft member 1221 may be formed with an air passage 1224 as shown in FIG. 13 in order to prevent gas accumulation at the interface between the shaft member 1221 and the membrane member 1222. This air passage 1224 extends from the radially inside of the weld part 33 at the interface between the shaft member 1221 and the membrane member 1222 to the outer peripheral surface of the shaft member 1221. Accordingly, the gas having permeated through the membrane member 1222 is released to the outside of the diaphragm assembly 122 through the air passage 1224.

Operations of Fluid Control Valve

Operations of the fluid control valve 1 configured as above will be described below. The fluid control valve 1 shown in FIG. 1 is in a valve closed state. When operation air is supplied from an operation air supply source (not shown) to the second air-inlet/outlet 112*a* of the fluid control valve 1 in the closed state, the operation air flows in the lower chamber 116*b* through the air passage 112*b*. As this supply of the operation air progresses, the internal pressure of the lower chamber 116b rises. When the pressure acting on the lower end face of the piston part 113a exceeds the urging force of the coil spring 114, the drive shaft 113 is moved in a valve opening direction, i.e., upward in FIG. 1, against the urging force of the coil spring 114. As the drive shaft 113 moves in the valve opening direction, the air in the upper chamber 116a is gradually compressed and exhausted to the outside of the drive unit 11 through the air passage 111b and the first air-inlet/outlet 111a. When the drive shaft 113 moves in the valve opening direction, the diaphragm assembly 122 threadedly connected to the tip of the second piston rod 113c is moved together in the valve opening direction. When the membrane member 1222, i.e., the contact portion 122b, moves apart from the annular valve seat 121d, the fluid control valve 1 comes in a valve open state as shown in FIG. 2.

When the supply of the operation air to the fluid control valve 1 in the valve open state is stopped, the pressure in the lower chamber 116b no longer acts against the urging force of the coil spring 114, and thus the drive shaft 113 is moved in the valve closing direction by the urging force of the coil spring 114. Then, the diaphragm assembly 122 threadedly connected to the tip of the second piston rod 113c is also moved in the valve closing direction, and the membrane member 1222, i.e., the contact portion 122b, comes into contact with the annular valve seat 121d. Accordingly, the fluid control valve 1 comes in the valve closed state. At this time, the operation air filled in the lower chamber 116b is discharged out of the drive unit 11 through the air passage 112b and the second air-inlet/outlet 112a, while the upper chamber 116a is supplied with air from outside the drive unit 11 through the first air-inlet/outlet 111a and the air passage 111b.

Method for Manufacturing the Fluid Control Valve

Figure 5:
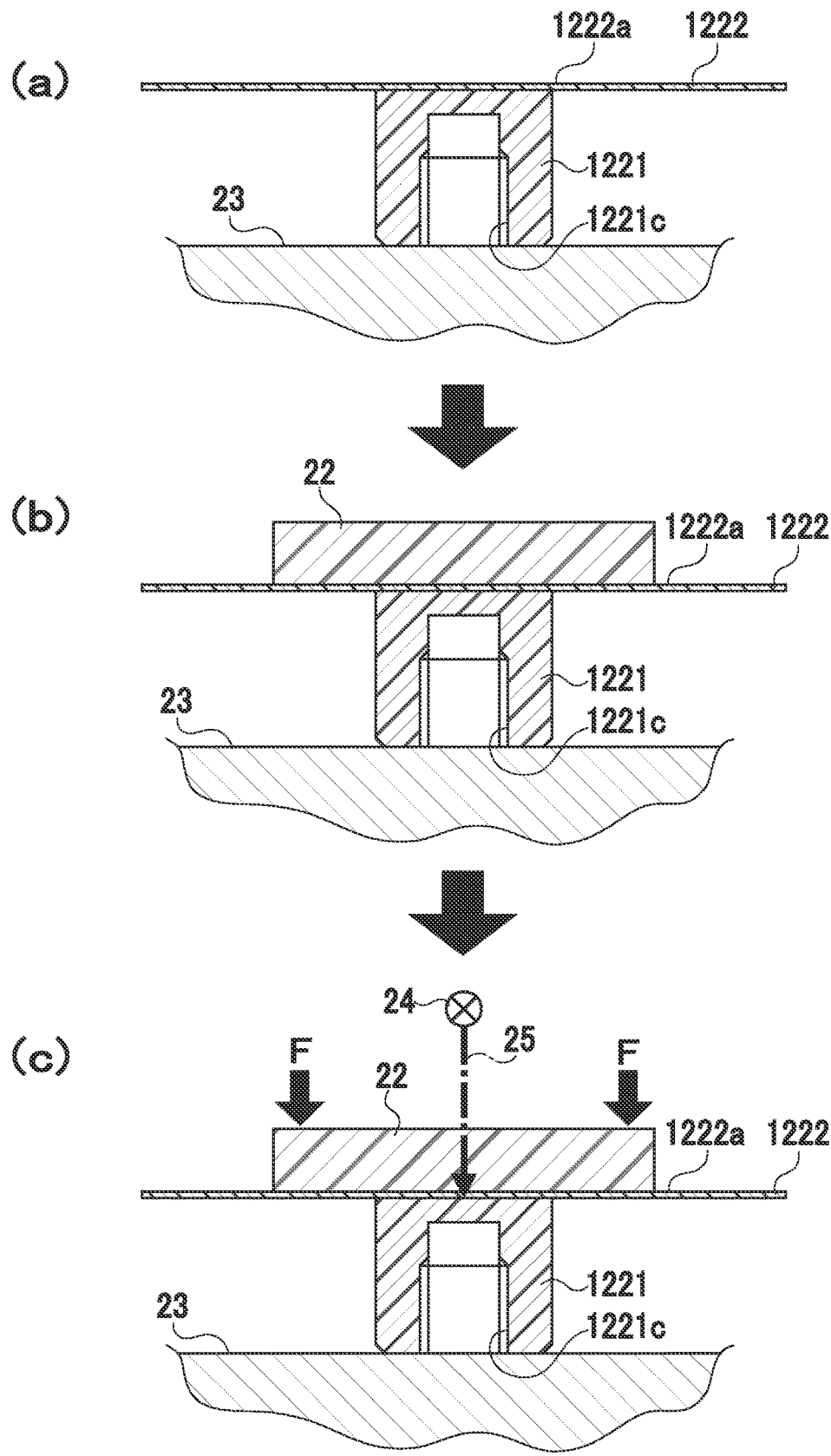
FIG. 5 is an explanatory view showing a process of manufacturing the diaphragm assembly by laser welding.
Figure 6:
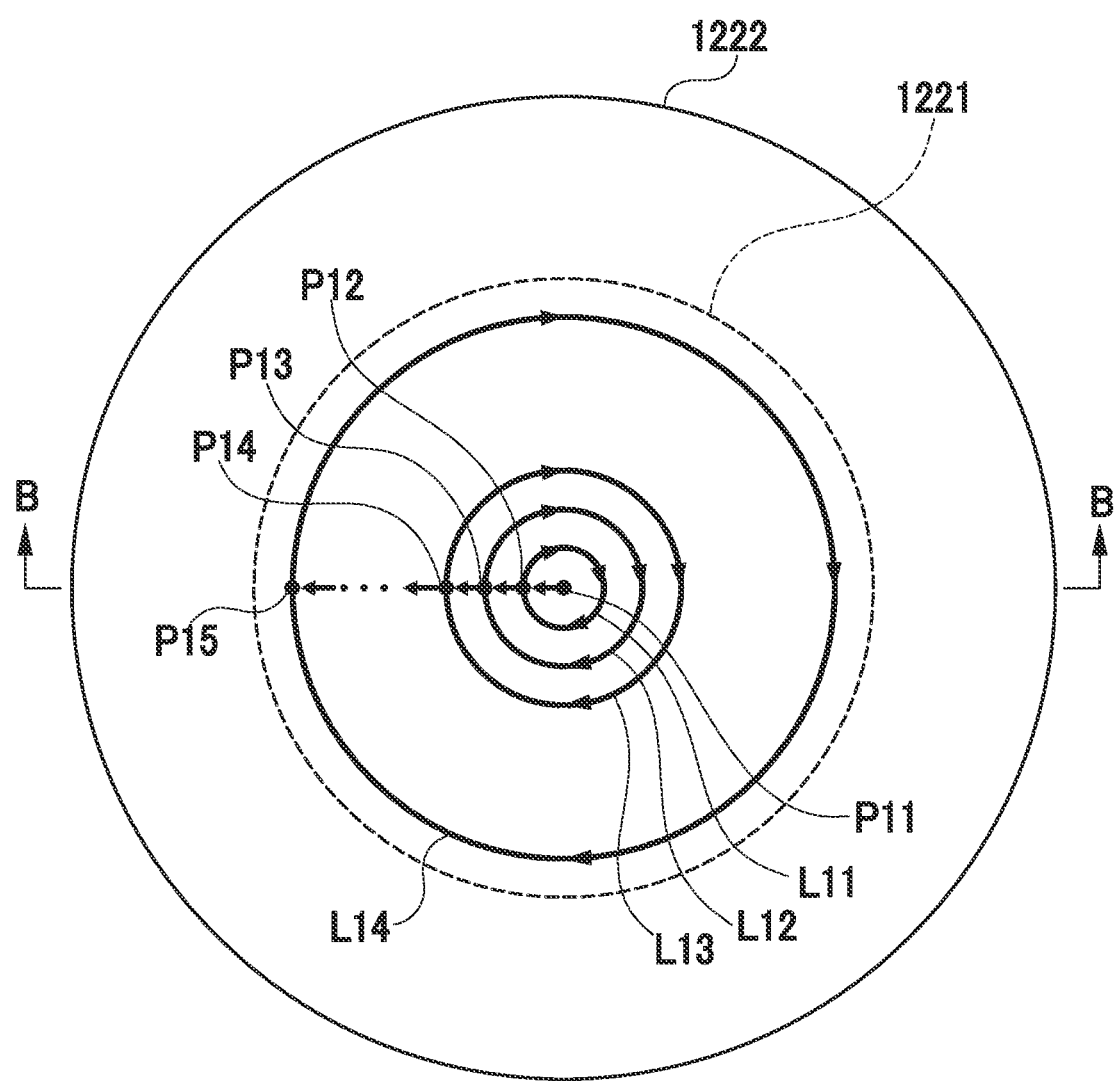
FIG. 6 is a conceptual diagram showing a scanning pattern of an infrared laser beam during laser welding, seen from a laser source.
Figure 7:
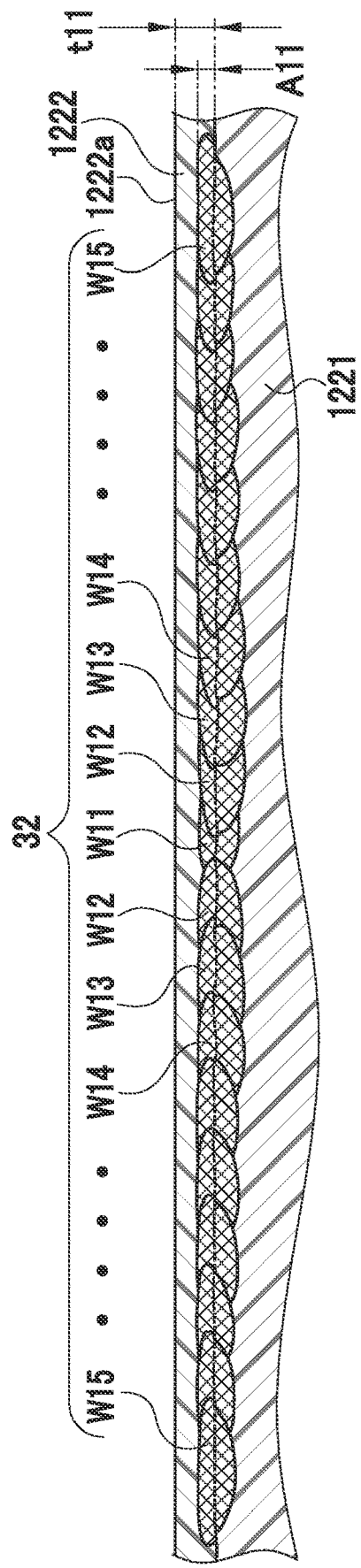
FIG. 7 is a cross-sectional view along a line B-B in FIG. 6, showing a state after laser welding.

A method for producing the fluid control valve 1 in the present embodiment will be described below. FIG. 5 is an explanatory view showing steps (a) to (c) of manufacturing the diaphragm assembly 122 by laser welding. FIG. 6 is a conceptual diagram showing a scanning pattern of an infrared laser beam 25 during laser welding, seen from a laser source. FIG. 7 is a cross-sectional view along a line B-B in FIG. 6.

In the method for manufacturing the fluid control valve in the present embodiment, firstly, the shaft member 1221 and the membrane member 1222 are joined as below to produce the diaphragm assembly 122.

Specifically, as shown in FIG. 5 (a), the shaft member 1221 is disposed in contact with a supporting member 23. At that time, the shaft member 1221 is put on the supporting member 23 so that a surface of the shaft member 1221 to be joined to the membrane member 1222 faces up. Then, the membrane member 1222 is placed on the shaft member 1221 in surface contact to overlap the shaft member 1221. At that time, the membrane member 1222 and the shaft member 1221 are aligned with their central axes coincident with each other.

Secondly, as shown in FIG. 5 (b), on the side of the membrane member 1222 opposite the supporting member 23, an infrared-transparent solid object 22 is disposed in contact with the membrane member 1222 placed over the shaft member 1221. The infrared-transparent solid object 22 exhibits heat sink functions. Herein, the infrared-transparent solid object 22 is made of infrared crystal materials having a thermal conductivity of 15 w/m·K or higher, such as zinc selenide (ZnSe), zinc sulfide (Zns), silicon (Si), germanium (Ge), sapphire ($Al_2O_3$), gallium arsenide (GaAs), and magnesium fluoride ($MgF_2$).

As shown in FIG. 5 (c), subsequently, while the shaft member 1221 and the membrane member 1222 are held in close contact under the compression force exerted in a direction indicated by arrows F, the infrared laser beam 25 is irradiated by a laser source 24 onto the shaft member 1221 and the membrane member 1222 from above the infrared-transparent solid object 22. The infrared laser beam 25 in the present embodiment has a wavelength of 0.37 μm to 15 μm and, preferably, it is selected from a $CO_2$ laser beam with a wavelength of 10.6 μm or 10.6±0.5 μm, a CO laser beam with a wavelength of 5.3 μm or 5.3±0.5 μm, and a semiconductor laser beam with a wavelength ranging from 375 nm to 2000 nm. In the case of using the semiconductor laser beam, it is desirable to select from a YAG laser beam with a wavelength of 1.06 μm or 1.06±0.5 μm, a fiber laser beam with a wavelength of 1.07 μm or 1.07±0.5 μm, and a thulium laser beam with a wavelength of 2.05 μm or 2.05±0.5 μm.

Focusing of the infrared laser beam 25 is adjusted so that a temperature distribution in the membrane member 1222 and the shaft member 1221 during irradiation of the infrared laser beam 25 is highest at the interface between the membrane member 1222 and the shaft member 1221. This infrared laser beam 25 melts some portions of the membrane member 1222 and shaft member 1221 at and near their interface, and the melted portions are then solidified to form a weld mark. The weld part 32 joining the membrane member 1222 and the shaft member 1221 is formed of a plurality of annular weld marks W11 to W15 which are formed concentrically.

To be specific, the weld part 32 is formed by irradiation of the infrared laser beam 25 as shown in FIG. 6. The infrared laser beam 25 starts to be irradiated at a start point P11, which is positioned on the central axes of of the shaft member 1221 and the membrane member 1222. From the start of irradiation, the infrared laser beam is continuously irradiated onto the start point P11 for a time required to form a weld mark W11 that forms the center of the weld part 32.

Then, the infrared laser beam 25 is scanned from the start point P11 to a first scan start point P12 located radially outside the start point P11. From the first scan start point P12, the infrared laser beam 25 is scanned circularly as depicted by a first scanning line L11 by moving clockwise about the center axes of the shaft member 1221 and the membrane member 1222. When the infrared laser beam 25 returns to the first scan start point P12, an annular weld mark W12 is formed along the first scanning line L11.

Furthermore, the infrared laser beam 25 is scanned from the first scan start point P12 to a second scan start point P13 located radially outside the first scan start point P12. From the second scan start point P13, the infrared laser beam 25 is scanned circularly as depicted by a second scanning line L12 by moving clockwise about the center axes of the shaft member 1221 and the membrane member 1222. When the infrared laser beam 25 returns to the second scan start point P13, an annular weld mark W13 is formed along the second scanning line L12. The diameter of this annular weld mark W13 is larger than the diameter of the weld mark W12 formed along the first scanning line L11 just by that much of the distance from the first scan start point P12 to the second scan start point P13.

Furthermore, the infrared laser beam 25 is scanned from the second scan start point P13 to a third scan start point P14 located radially outside the second scan start point P13. From the third scan start point P14, the infrared laser beam 25 is scanned circularly as depicted by a third scanning line L13 by moving clockwise about the center axes of the shaft member 1221 and the membrane member 1222. From the third scan start point P14, the infrared laser beam 25 is scanned circularly as depicted by a third scanning line L13 by moving clockwise about the center axes of the shaft member 1221 and the membrane member 1222. When the infrared laser beam 25 returns to the third scan start point P14, an annular weld mark W14 is formed along the third scanning line L13. The diameter of this annular weld mark W14 is larger than the diameter of the weld mark W13 formed along the second scanning line L12 just by that much of the distance from the second scan start point P13 to the third scan start point P14.

While the above scanning is repeated, a plurality of weld marks with the diameters gradually increasing from inside to outside in the radial direction are sequentially formed. The scanning amount to a radially adjacent scanning line, for example, a distance from the first scan start point P12 to the second scan start point P13 or a distance from the second scan start point P13 to a third scan start point P14, is set smaller than the beam diameter of the infrared laser beam 25. For example, the scanning amount is 0.8 mm for the infrared laser beam 25 with a diameter of 1 mm. Accordingly, adjacent weld marks in a radial direction are formed so that the weld marks on the outer circumferential side in the radial direction overlap the outer edges of the weld marks on the inner circumferential side. To be concrete, as shown in FIG. 7, the radially adjacent weld marks W12 and W13 are formed so that the weld mark W13 located radially outside overlaps the outer edge of the weld mark W12 located radially inside.

On the outermost circumference, the infrared laser beam 25 is scanned circularly as depicted by a final scanning line L14 by moving from a final scan start point P15 clockwise about the shaft member 1221 and the membrane member 1222. When an annular weld mark W15 is formed along the final scanning line L14, irradiation of the infrared laser beam 25 is stopped at the final scan start point P15. Thus, the shaft member 1221 and the membrane member 1222 are joined together, and the diaphragm assembly 122 is completed.

Since the weld part 32 is formed in the above manner that multiple annular weld marks W11 to W15 are formed without gaps, or intervals, between radially adjacent ones, a gas, such as air, at the interface between the shaft member 1221 and the membrane member 1222 is sequentially pushed outward to the outer circumferential side during laser welding. This enables to join the shaft member 1221 and the membrane member 1222 without gaps.

Figure 14:
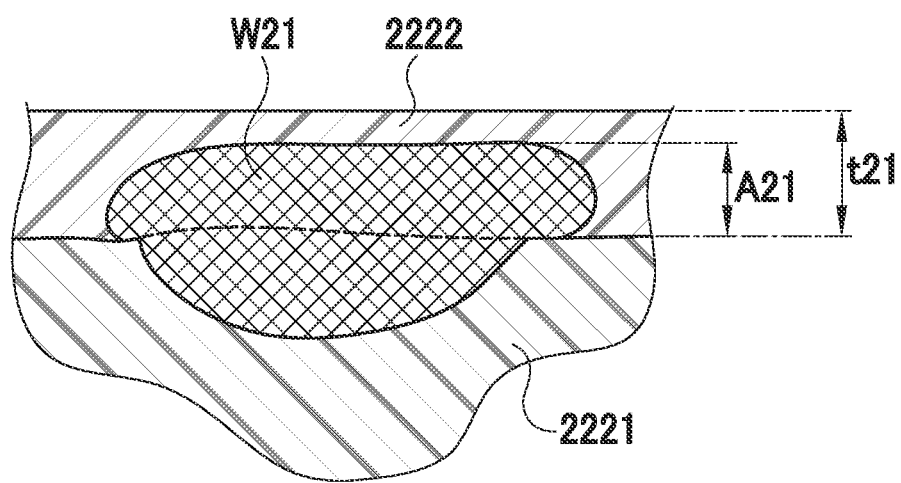
FIG. 14 is an explanatory view showing issues of a conventional fluid control valve.

Moreover, since the shaft member 1221 is made of PFA containing dispersed carbon black, this shaft member 1221 has higher laser-light absorbability than one made of common fluorine resin. Thus, this shaft member 1221 with such a high laser-light absorbability can easily absorb a laser beam during laser welding to join the shaft member 1221 and the membrane member 1222, so that they can be joined together with a lower heat quantity than ever before. This can reduce a heat affected range of the membrane member 1222, which is thermally affected by the infrared laser beam 25. Specifically, as shown in FIG. 7, in the membrane member 1222, the zone in which the weld marks W11 to W15 are formed has a heat affected range A11, corresponding to the distance in the thickness direction of the membrane member 1222, is about 40% of the thickness t11 of the membrane member 1222. In contrast, in the conventional art in which the membrane member 2222 is joined to the shaft member 2221 containing no carbon-based additive, the heat affected range A21 is as large as about 80% of the thickness t21 of the membrane member 2222 (see FIG. 14). Since the membrane member 1222 with the smaller heat affected range than ever, it is possible to prevent the strength of the membrane member 1222 from decreasing due to laser welding. This can reduce the risk that the membrane member 1222 undergoes fatigue failure caused by repeated elastic deformation.

The scanning pattern of the infrared laser beam shown in FIG. 6 is to form the weld part 32 all over the interface between the shaft member 1221 and the membrane member 1222. In another example that the weld part 33 is provided only on the back side of the contact portion 122b as shown in FIG. 12, annular weld marks are formed in sequence from the inner circumferential side to the outer circumferential side of the area corresponding to the contact portion 122b, forming the weld part 33.

The supporting member 23 described above is used to keep the infrared-transparent solid object 22, the membrane member 1222, and the shaft member 1221 in stable contact state during irradiation of the infrared laser beam 25. Accordingly, the supporting member 23 may be made of any material and in any shape as long as it can serve as above. For example, it is conceivable to utilize a supporting member formed of a metal block or plate, which is made of steel, aluminum alloy, copper alloy, or the like, and is resistant to plastic deformation even if subjected to the compressive force as indicated by the arrows F and has appropriate rigidity.

Moreover, the supporting member 23 may include a rubber buffer layer as the top layer on the irradiation side of the infrared laser beam 25. When joining the membrane member 1222 and the shaft member 1221, made of thermoplastic resin, such as PFA or PTFE, which has a thin thickness or a high thermal shrinkage property, their own surface undulations may cause insufficient contact pressure and contact area between the infrared-transparent solid object 22, the membrane member 122, and the shaft member 1221. This may result in defects such as voids, tears, and shrinkage in the weld part after joining. To address those defects, the supporting member 23 may be provided with the buffer layer so that the contact pressure and contact area between the infrared-transparent solid object 22, the membrane member 1222, and the shaft member 1221 can be improved, and hence the defects such as voids, tears, and remarkable shrinkage after joining can be suppressed.

Modified Example of Fluid Control Valve

Figure 8:
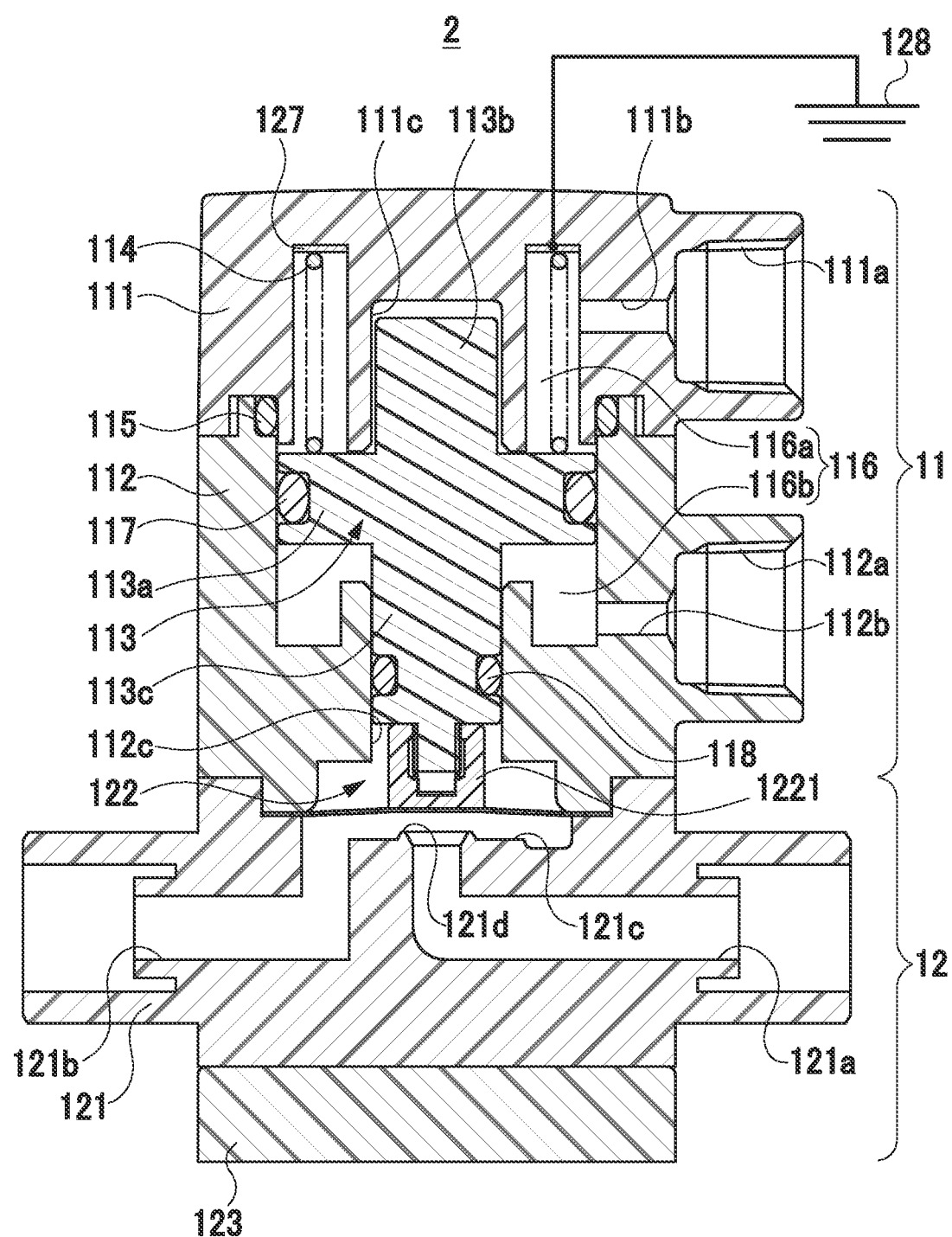
FIG. 8 is a cross-sectional view of a fluid control valve in a modified example.

In the fluid control valve 1, as described above, the shaft member 1221 has high conductivity, which is effective in discharging static electricity. As a modified example, a grounding wire 128 may be provided as in a fluid control valve 2 shown in FIG. 8. This fluid control valve 2 will be described below with a focus on differences from the fluid control valve 1.

In the fluid control valve 2, the drive shaft 113 is made of a conductive material such as metal (e.g., stainless steel). In the first housing 111, a conductive plate member 127 made of metal or the like (e.g., stainless steel) is installed on the upper surface of the inner wall on which the coil spring 114 abuts. This plate member 127 is connected to the grounding wire 128 to allow discharging of the static electricity to the outside of the fluid control valve 2. In the fluid control valve 2 configured as above, a conductive path is defined by the shaft member 1221 of the diaphragm assembly 122, the drive shaft 113, the coil spring 114, the plate member 127, and the grounding wire 128. The thus formed conductive path ensures discharging of the static electricity generated when the control fluid passes through the flow passage.

Figure 9:
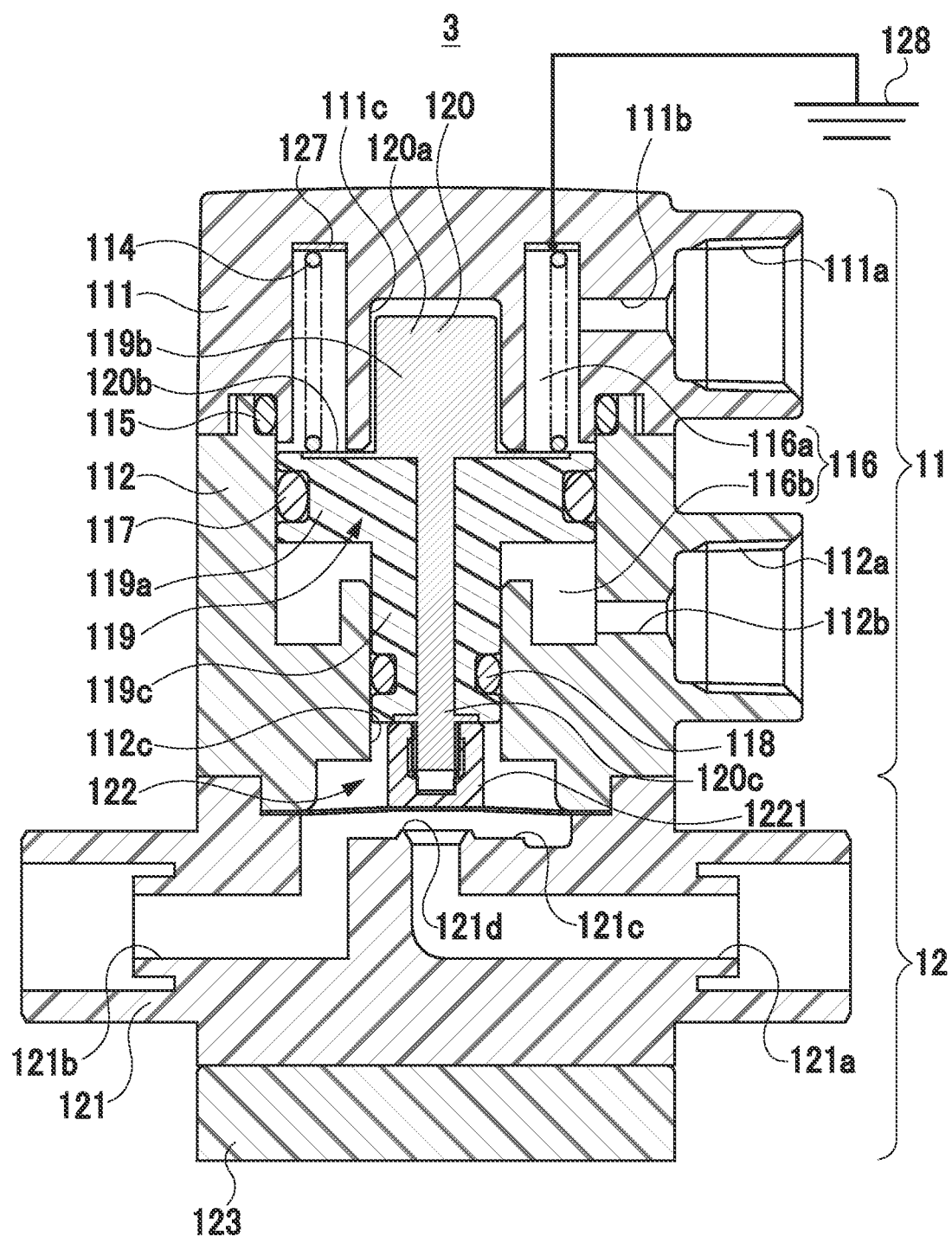
FIG. 9 is a cross-sectional view of a fluid control valve in another modified example.

Another example adopting a grounding wire may be configured as a fluid control valve 3 shown in FIG. 9. This fluid control valve 3 will be described below with a focus on differences from the fluid control valve 1.

A drive shaft 119 in the fluid control valve 3 has an overall outer shape identical to the drive shaft 113, excepting that the drive shaft 119 includes a metal conductive member 120 integrally inserted by insert molding. The drive shaft 119 includes a piston part 119a, a first piston rod 119b, and a second piston rod 119c.

The conductive member 120 includes a large-diameter portion 120a that forms the first piston rod 119b of the drive shaft 119. At the lower end of the large-diameter portion 120a, a circular disk portion 120b is provided, forming the upper end face of the piston part 119a. The lower end of the coil spring 114 abuts on the circular disk portion 120b. Further, the conductive member 120 includes a small-diameter portion 120c having smaller diameter than the large-diameter portion 120a and extending from the lower end face of the large-diameter portion 120a and through the drive shaft 119. The tip of the small-diameter portion 120c protrudes from the tip of the piston rod 119c of the drive shaft 119 and is connected to the shaft member 1221.

In the fluid control valve 3, as in the foregoing fluid control valve 2, the plate member 127 is placed and connected to the grounding wire 128. In the fluid control valve 3 configured as above, a conductive path is formed by the shaft member 1221, the conductive member 120, the coil spring 114, the plate member 127, and the grounding wire 128. This conductive path formed as above ensures that the static electricity generated by the control fluid passing through the flow passage is discharged.

Modified Example of Diaphragm Assembly

Figure 10:
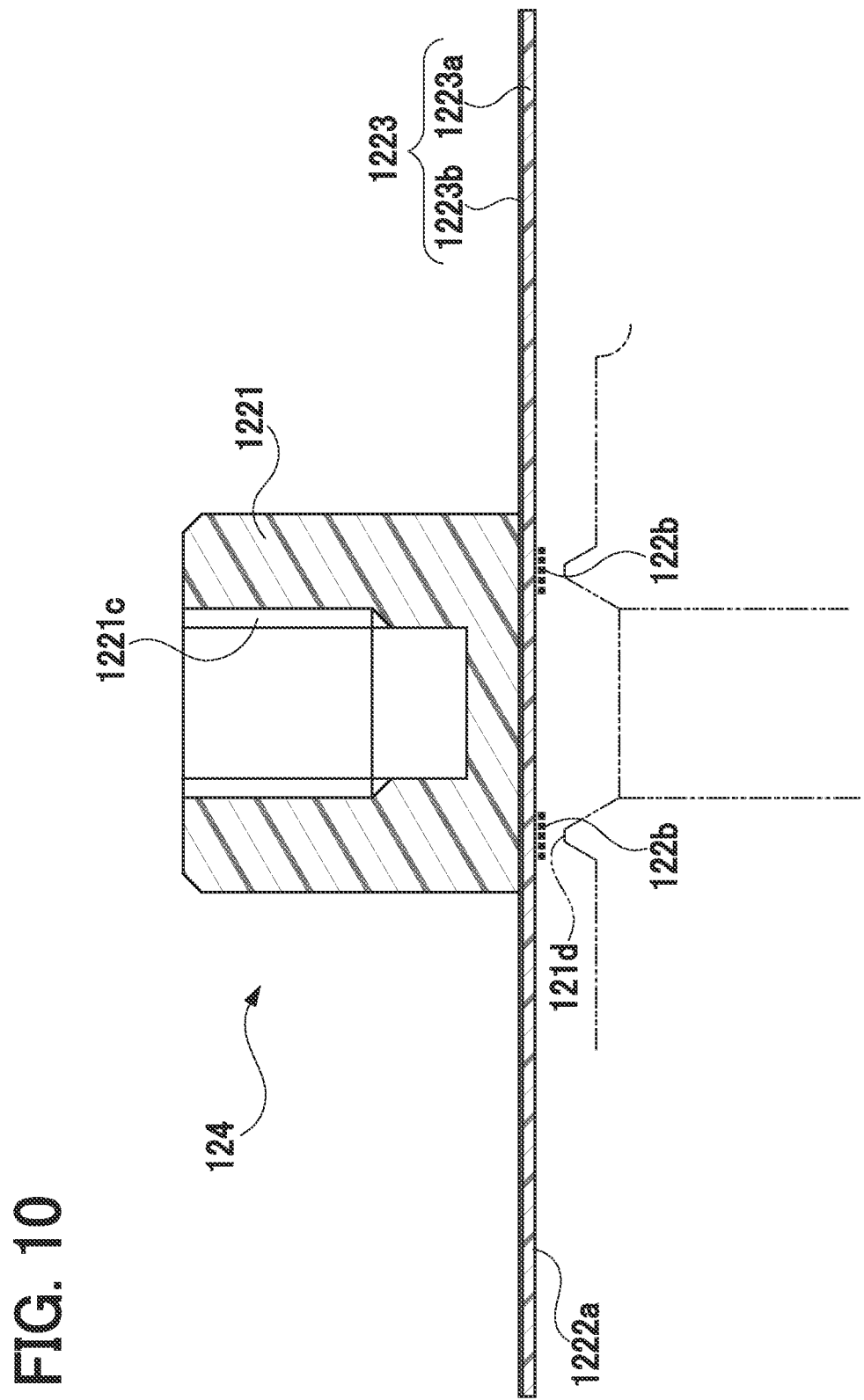
FIG. 10 is a cross-sectional view of a diaphragm assembly in a modified example.

As a modified example of the diaphragm assembly, a diaphragm assembly 124 shown in FIG. 10 will be described below with a focus on differences from the diaphragm assembly 122.

A membrane member 1223 constituting the diaphragm assembly 124 is formed in two layers. One of the two layers is a first layer 1223a located on the side facing the annular valve seat 121d and made of PFA, as with the foregoing membrane member 1222, and has the same thickness as the membrane member 1222. The other is a second layer 1223b located on the side facing the shaft member 1221 and made of PFA with carbon black dispersed therein. That is, the second layer 1223b is a highly-conductive layer. The content of the carbon black in the second layer 1223b may be preferably set in a range from 1.5% by weight to 5% by weight and more preferably, from 3% by weight to 4% by weight. In the present embodiment, this content is about 3.5% by weight. Further, the second layer 1223b has a thickness of about 0.02 mm. This thickness is a mere example and can be chosen appropriately so as not to inhibit elastic deformation of the membrane member 1223, for example, from a range of 0.01 mm to 0.1 mm. The first layer 1223a and the second layer 1223b may be joined together by double injection molding or alternately may be separately molded and then joined by compression press molding.

Since the membrane member 1223 is configured as above, the highly-conductive second layer 1223b of the membrane member 1223 is welded to the highly-conductive shaft member 1221. This configuration ensures discharging of the static electricity generated when the control fluid passes through the flow passage.

The second layer 1223b, which contains dispersed carbon black and has enhanced laser-light absorbability, absorbs laser light together with the shaft member 1221 when the shaft member 1221 and the membrane member 1223 are joined by laser welding. Thus, this joining can be performed with a lower heat quantity than ever before, resulting in a reduced heat affected range of the membrane member 1223. The process of laser welding to produce the diaphragm assembly 124 is the same as that shown in FIG. 5.

Figure 11:
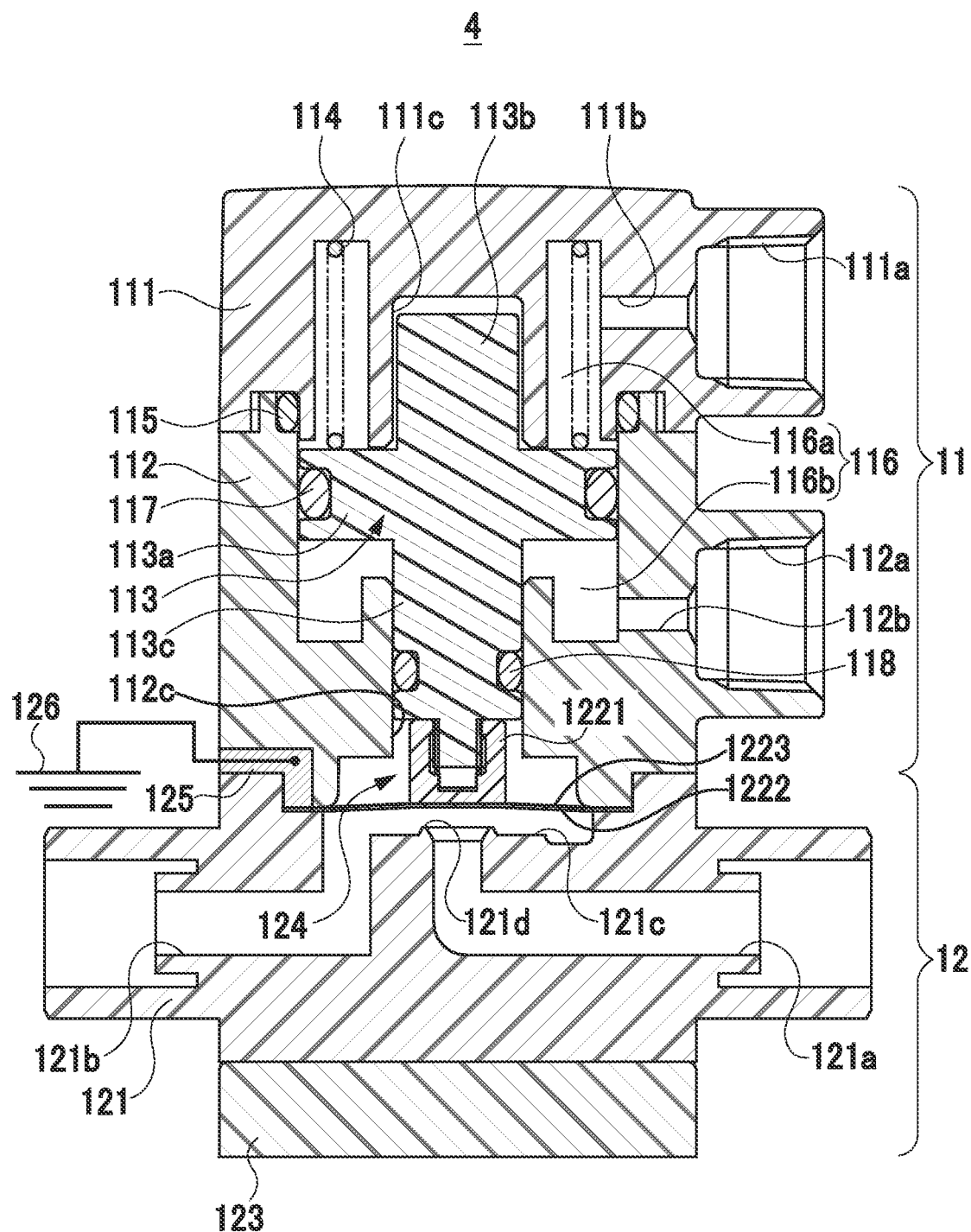
FIG. 11 is a cross-sectional view of a fluid control valve provided with the diaphragm assembly shown in FIG. 10.

For a fluid control valve provided with the diaphragm assembly 124, a grounding wire 126 may be provided as in a fluid control valve 4 shown in FIG. 11. This fluid control valve 4 will be described below with a focus on differences from the fluid control valve 1.

The fluid control valve 4 is provided with a conductive member 125, which is made of metal such as stainless steel and located on the end of the second housing 112 (i.e., the lower end in FIG. 11) on a side near the valve-unit body 121. This conductive member 125 is positioned to contact the second layer 1223b while the membrane member 1223 is held, from above and below, between the second housing 112 and the valve-unit body 121. The conductive member 125 is connected to the grounding wire 126.

In the fluid control valve 4 configured as above, the second layer 1223b of the diaphragm assembly 124, the conductive member 125, and the grounding wire 126 form a conductive path. The thus formed conductive path ensures discharging of the static electricity generated when the control fluid passes through the flow passage. The second layer 1223b may be made of PFA with carbon nanotube dispersed. In this case, the content of carbon nanotube in the second layer 1223b is preferably set in a range from 0.01% by weight to 0.1% by weight. In the present embodiment, this content is set to about 0.02% by weight. The configuration of the fluid control valve 4 is a mere example, and the diaphragm assembly 122 in each of the fluid control valves 1, 2, and 3 may be replaced with the conductive member 124.

Materials of Shaft Member

The above-described embodiments exemplify the shaft member 1221 made of PFA with dispersed carbon black, but may be made of PFA with dispersed carbon nanotube. The content of this carbon nanotube is preferably in a range from 0.01% by weight to 0.1% by weight. This content in the present embodiment is about 0.02% by weight.

The material of the shaft member 1221 is not limited to PFA and may be polytetrafluoroethylene (PTFE) with dispersed carbon-based additive, such as carbon nanotube and carbon black. The joining strength by laser welding is superior to joining between the same materials (PFA to PFA), but PTFE is advantageous in excellent chemical resistance.

The fluid control valve and the method for manufacturing the same in the present embodiments configured as above can achieve the following advantageous effects. In the following description, for the sake of simplification, the embodiments and the modified examples are described together with all the reference signs listed for each part name, but it is not intended that all of the parts or components under the same name but with different reference signs be included in one fluid control valve at the same time.

(1) The fluid control valve 1, 2, 3, 4 includes: the flow passage (e.g., a continuous flow passage formed by connection of the inflow passage 121a and the outflow passage 121b) through which the control fluid (e.g., a chemical solution) flows; the annular valve seat 121d provided in the flow passage; the diaphragm assembly 122, 124 that contacts with and separates from the annular valve seat 121d to control a flow of the control fluid; and the drive shaft 113, 119 that is aligned coaxial with the annular valve seat 121d and moves the diaphragm assembly 122, 124 in a direction to contact with or separate from the annular valve seat 121d. The diaphragm assembly 122, 124 includes the shaft member 1221 joined on one side to the end of the drive shaft 113, 119 on the side near the annular valve seat 121d; the membrane member 1222, 1223 made of perfluoro alkoxy alkane and placed in surface contact with the end face of the shaft member 1221 on the opposite side from the one side joined to the drive shaft 113, 119; and the weld part 32, 33 formed by laser welding at the interface between the shaft member 1221 and the membrane member 1222, 1223 to join the shaft member 1221 and the membrane member 1222, 1223. The shaft member 1221 is made of fluorine resin, e.g., PFA or PTFE, containing a carbon-based additive dispersed therein.

(2) In the method for manufacturing a fluid control valve 1, 2, 3, 4 that includes: the flow passage (e.g., a continuous flow passage formed by connection of the inflow passage 121a and the outflow passage 121b) through which the control fluid (e.g., a chemical solution) flows; the annular valve seat 121d provided in the flow passage; the diaphragm assembly 122, 124 that contacts with and separates from the annular valve seat 121d to control a flow of the control fluid; and the drive shaft 113, 119 that is aligned coaxial with the annular valve seat 121d and moves the diaphragm assembly 122, 124 in a direction to contact with or separate from the annular valve seat 121d, there is included a step of joining the shaft member 1221, which is to be coupled on one side to the end of the drive shaft 113, 119 on the side near the annular valve seat 121d, to the membrane member 1222, 1223 made of perfluoro alkoxy alkane and placed in surface contact with the end face of the shaft member 1221 on the opposite side from the one side to be coupled to the drive shaft 113, 119, by laser welding, to form the weld part 32, 33 at the interface between the shaft member 1221 and the membrane member 1222, 1223 to produce the diaphragm assembly 122, 124. The shaft member 1221 is made of fluorine resin, e.g., PFA or PTFE, containing a carbon-based additive dispersed therein.

(1) According to the fluid control valve 1, 2, 3, 4 described in (1) or the fluid control valve manufacturing method described in (2), the shaft member 1221 is made of fluorine resin containing a carbon-based additive dispersed, so that the shaft member has higher conductivity than a shaft member made of common fluorine resin. This configuration can discharge the static electricity generated when the control fluid passes through the flow passage, and prevent the control fluid and the liquid contact part from becoming electrically charged.

Since the control fluid and the liquid contact part can be prevented from becoming electrically charged, it is possible to prevent an increase in potential difference between the liquid contact part and the liquid non-contact part in the fluid control valve 1, 2, 3, 4. Preventing the increase in potential difference can thus prevent the occurrence of dielectric breakdown in the membrane member 1222, 1223. This prevention of dielectric breakdown of the membrane member 1222, 1223 can further prevent the occurrence of microcracks due to dielectric breakdown and hence prevent fluid leakage and fatigue failure, which may be caused by such cracks. Moreover, since the fluid control valve is configured to prevent electrical charging of a control fluid as above, it is possible to prevent for example a wafer in a semiconductor manufacturing apparatus from contacting an electrically-charged control fluid. This can reduce any risk of defects that defective circuit patterns are developed.

According to the fluid control valve 1, 2, 3, 4 described in (1) or the fluid control valve manufacturing method described in (2), the shaft member 1221 is made of fluorine resin containing a carbon-based additive dispersed therein, so that the shaft member 1221 has higher laser-light absorbability than a shaft member made of common fluorine resin. Thus, this shaft member 1221 having such a high laser-light absorbability can easily absorb a laser beam during laser welding to join the shaft member 1221 and the membrane member 1222, 1223, so that the shaft member 1221 and the membrane member 1222, 1223 can be joined together with a lower heat quantity than ever before. This can reduce a heat affected range A11 of the membrane member 1222, 1223 than ever before. Such a reduced heat affected range A11 of the membrane member 1222, 1223 can prevent a decrease in the strength of the membrane member 1222, 1223 due to laser welding. This can reduce any risk of fatigue failure of the membrane member 1222, 1223 caused by repeated elastic deformation.

(3) In the fluid control valve 1, 2, 3, 4 described in (1), the membrane member 1222, 1223 includes the contact portion 122b in the surface on an opposite side from the side near the shaft member 1221, and the contact portion 122b will contact with the annular valve seat 121d. The weld part 32, 33 is located at least on the back side of the contact portion 122b.

(4) In the fluid control valve manufacturing method described in (2), the membrane member 1222, 1223 includes the contact portion 122b in the surface on an opposite side from the side near the shaft member 1221, and the contact portion 122b will contact with the annular valve seat 121d. The weld part 32, 33 is located at least on the back side of the contact portion 122b.

In a fluid control valve, generally, the area of a flow passage defined between an annular valve seat and a contact portion that will contact with the annular valve seat is smaller than the area of other flow passages. This causes a control fluid to flow at a faster velocity through the passage between the annular valve seat and the contact portion than the other passage. Accordingly, the static electricity is likely to occur when the control fluid flows between the annular valve seat and the contact portion.

According to the fluid control valve 1, 2, 3, 4 described in (3) or the fluid control valve manufacturing method described in (4), the weld part 32, 33 is formed on the back side of the contact portion 122b. Specifically, the membrane member 1222, 1223 is joined, on the back side of the contact portion 122b on which static electricity is likely to occur, to the high conductive shaft member 1221. This configuration ensures discharging of the static electricity.

(5) In the fluid control valve 1, 2, 3, 4 described in (1) or (3), the membrane member 1223 includes a layer (the second layer 1223b) containing a carbon-based additive on the side facing the shaft member 1221.

(6) In the fluid control valve manufacturing method described in (2) or (4), the membrane member 1223 includes a layer (the second layer 1223b) containing a carbon-based additive on the side facing the shaft member 1221.

According to the fluid control valve 1, 2, 3, 4 described in (5) or the fluid control valve manufacturing method described in (6), the membrane member 1223 includes a layer (the second layer 1223b) containing a carbon-based additive and having high conductivity on the side facing the shaft member 1221. In other words, the high conductive layer (the second layer 1223*b*) of the membrane member 1223 is joined to the high conductive shaft member 1221. This configuration ensures discharging of the static electricity generated when the control fluid passes through the flow passage.

According to the fluid control valve 1, 2, 3, 4 described in (5) or the fluid control valve manufacturing method described in (6), the membrane member 1223 includes a layer (the second layer 1223*b*) containing a carbon-based additive and having high laser-light absorbability on the side facing the shaft member 1221. In other words, the high laser-light absorbable layer of the membrane member 1223 is joined to the shaft member 1221 having high laser-light absorbability. The shaft member 1221 and the layer of the membrane member 1223 facing the shaft member 1221, i.e., the second layer 1223*b*, easily absorb laser light, so that the shaft member 1221 and the membrane member 1223 can be joined together by laser welding with a lower heat quantity than ever before. This can reduce the heat affected range of the membrane member 1223.

(7) In the fluid control valve 1, 2, 3, 4 described in (1) or (3), preferably, the carbon-based additive is for example carbon black or carbon nanotube. Alternatively, in the fluid control valve 1, 2, 3, 4 described in (5), preferably, the carbon-based additive dispersed in the fluorine resin forming the shaft member 1221 is for example carbon black or carbon nanotube and the carbon-based additive contained in the layer of the membrane member 1222, 1223 is for example carbon black or carbon nanotube.

(8) In the fluid control valve manufacturing method described in (2) or (4), preferably, the carbon-based additive is for example carbon black or carbon nanotube. Alternatively, in the fluid control valve manufacturing method described in (6), preferably, the carbon-based additive dispersed in the fluorine resin forming the shaft member 1221 is for example carbon black or carbon nanotube and the carbon-based additive contained in the layer of the membrane member 1222, 1223 is for example carbon black or carbon nanotube.

When the carbon-based additive is carbon black, the content is set preferably in a range from 1.5% to 5% by weight and more preferably from 3% to 4% by weight. This is because the content less than 1.5% by weight cannot exhibit sufficient laser-light absorbability and sufficient conductivity. Further, this is because the higher content can improve the laser-light absorbability and the conductivity, but the content exceeding 5% by weight may deteriorate the material strength.

When the carbon-based additive is carbon nanotube, the content is set preferably in a range from 0.01% to 0.1% by weight. This is because the content less than 0.01% by weight cannot exhibit sufficient laser-light absorbability and sufficient conductivity. Further, this is because the higher content can improve the laser-light absorbability and the conductivity, but the content exceeding 0.1% by weight may deteriorate the material strength.

The foregoing embodiments are mere examples and give no limitations to the present disclosure. The present disclosure may be embodied in other specific forms without departing from the essential characteristics thereof. For instance, the drive system of the fluid control valve 1 in the foregoing embodiment is an air-operated type, but it is not limited thereto. The fluid control valve 1 in the foregoing embodiment is a normally-closed type, but it may be a normally-open type.

REFERENCE SIGNS LIST

1 Fluid control valve
32 Weld part
113 Drive shaft
121*d* Annular valve seat
122 Diaphragm assembly
1221 Shaft member
1222 Membrane member

What is claimed is:

1. A fluid control valve comprising:
   a flow passage for flowing a control fluid;
   an annular valve seat provided in the flow passage;
   a diaphragm assembly configured to contact with or separate from the annular valve seat to control a flow of the control fluid; and
   a drive shaft that is located coaxially with the annular valve seat and moves the diaphragm assembly in a direction to contact with or separate from the annular valve seat, wherein the diaphragm assembly comprises:
   a shaft member coupled on one side to an end of the drive shaft on a side near the annular valve seat;
   a membrane member made of perfluoro alkoxy alkane and positioned in surface contact with an end face of the shaft member on an opposite side from the one side coupled to the drive shaft; and
   a weld part that is formed in a shape of a string of beads in a cross-section by laser welding, which is performed by irradiating a laser beam onto the membrane member so that the laser beam passes through the membrane member, at an interface between the shaft member and the membrane member and joins the shaft member and the membrane member,
   the shaft member is made of fluorine resin containing a carbon-based additive dispersed,
   the weld part is formed of a weld mark with a diameter gradually increasing from a center of the weld part toward an outer circumferential side,
   the weld mark is formed such that portions adjacent in a radial direction overlap each other so that a portion of the weld mark, located on the outer circumferential side, overlaps an outer edge of another portion located on an inner circumferential side,
   the radial direction is perpendicular to the direction in which the diaphragm assembly contacts with or separates from the annular valve seat,
   the membrane member includes a contact portion in a surface on an opposite side from a side facing the shaft member, and the contact portion will contact with the annular valve seat, and
   the weld part is located at least on a back side of the contact portion.

2. The fluid control valve according to claim 1, wherein the membrane member includes a layer containing a carbon-based additive on a side facing the shaft member.

3. The fluid control valve according to claim 2, wherein the carbon-based additive dispersed in the fluorine resin forming the shaft member is carbon black or carbon nanotube; and
   the carbon-based additive contained in the layer of the membrane member is carbon black or carbon nanotube.

4. The fluid control valve according to claim 1, wherein the carbon-based additive is carbon black or carbon nanotube.

5. A method for manufacturing a fluid control valve, the fluid control valve comprising:
   a flow passage for flowing a control fluid;

an annular valve seat provided in the flow passage;
a diaphragm assembly configured to contact with or separate from the annular valve seat to control a flow of the control fluid; and
a drive shaft that is located coaxial with the annular valve seat and moves the diaphragm assembly in a direction to contact with or separate from the annular valve seat,
wherein the method comprises:
joining, by laser welding, a shaft member, which is to be coupled on one side to an end of the drive shaft on a side near the annular valve seat, to a membrane member made of perfluoro alkoxy alkane and positioned in surface contact with an end face of the shaft member on an opposite side from the one side to be coupled to the drive shaft to form a weld part in a shape of a string of beads in a cross-section at an interface between the shaft member and the membrane member to produce the diaphragm assembly, the laser welding being performed by irradiating a laser beam onto the membrane member so that the laser beam passes through the membrane member, and
wherein the shaft member is made of fluorine resin containing a carbon-based additive dispersed,
the weld part is formed of a weld mark with a diameter gradually increasing from a center of the weld part toward an outer circumferential side,
the weld mark is formed such that portions adjacent in a radial direction overlap each other so that a portion of the weld mark, located on the outer circumferential side, overlaps an outer edge of another portion located on an inner circumferential side,
the radial direction is perpendicular to the direction in which the diaphragm assembly contacts with or separates from the annular valve seat,
the membrane member includes a contact portion in a surface on an opposite side from a side facing the shaft member, and the contact portion will contact with the annular valve seat, and
the weld part is located at least on a back side of the contact portion.

6. The method for manufacturing a fluid control valve, according to claim 5, wherein the membrane member includes a layer containing a carbon-based additive on a side facing the shaft member.

7. The method for manufacturing a fluid control valve, according to claim 6, wherein
the carbon-based additive dispersed in the fluorine resin forming the shaft member is carbon black or carbon nanotube; and
the carbon-based additive contained in the layer of the membrane member is carbon black or carbon nanotube.

8. The method for manufacturing a fluid control valve, according to claim 5, wherein the carbon-based additive is carbon black or carbon nanotube.

* * * * *